Dec. 20, 1960 B. P. BAKER 2,965,735

COMPRESSED-GAS CIRCUIT INTERRUPTER

Filed June 7, 1956 16 Sheets-Sheet 1

Dec. 20, 1960 B. P. BAKER 2,965,735

COMPRESSED-GAS CIRCUIT INTERRUPTER

Filed June 7, 1956 16 Sheets-Sheet 2

Dec. 20, 1960 B. P. BAKER 2,965,735

COMPRESSED-GAS CIRCUIT INTERRUPTER

Filed June 7, 1956 16 Sheets-Sheet 5

WITNESSES

Edwin E. Bassler

Wm. C. Groome

INVENTOR

Benjamin P. Baker

BY

Willard R. Crout

ATTORNEY

COMPRESSED-GAS CIRCUIT INTERRUPTER

Filed June 7, 1956 16 Sheets-Sheet 6

Dec. 20, 1960 B. P. BAKER 2,965,735

COMPRESSED-GAS CIRCUIT INTERRUPTER

Filed June 7, 1956 16 Sheets-Sheet 10

Dec. 20, 1960 B. P. BAKER 2,965,735

COMPRESSED-GAS CIRCUIT INTERRUPTER

Filed June 7, 1956 16 Sheets-Sheet 11

Dec. 20, 1960 | B. P. BAKER | 2,965,735

COMPRESSED-GAS CIRCUIT INTERRUPTER

Filed June 7, 1956

16 Sheets-Sheet 12

Dec. 20, 1960 B. P. BAKER 2,965,735

COMPRESSED-GAS CIRCUIT INTERRUPTER

Filed June 7, 1956 16 Sheets-Sheet 13

Dec. 20, 1960 B. P. BAKER 2,965,735

COMPRESSED-GAS CIRCUIT INTERRUPTER

Filed June 7, 1956 16 Sheets-Sheet 15

Dec. 20, 1960 B. P. BAKER 2,965,735

COMPRESSED-GAS CIRCUIT INTERRUPTER

Filed June 7, 1956 16 Sheets-Sheet 16

2,965,735
Patented Dec. 20, 1960

2,965,735

COMPRESSED-GAS CIRCUIT INTERRUPTER

Benjamin P. Baker, Monroeville, Pa., assignor to Westinghouse Electric Corporation, East Pittsburgh, Pa., a corporation of Pennsylvania Filed June 7, 1956, Ser. No. 590,066

21 Claims. (Cl. 200—148)

This invention relates to compressed-gas circuit interrupters in general, and, more particularly, to compressed-gas circuit interrupters particularly adaptable for high-power applications.

A general object of the invention is to provide an improved compressed-gas circuit interrupter, in which improved and more effective operation is obtained than has been obtained in circuit interrupters heretofore constructed.

Another more specific object of the present invention is to provide an improved circuit interrupter particularly adapted for enclosure within a pressurized tank or container. In such connection, the arrangement is particularly desirable for adaptation with a hollow terminal bushing extending interiorly within such pressurized container.

A further object of the invention is to provide an improved constructional arrangement for a compressed-gas circuit interrupter of the type utilizing a main current interrupting unit, which is paralleled by an adjacently disposed impedance interrupting unit. As well known in the art, the opening of the main current interrupting unit forces the main current to pass through the parallel disposed impedance interrupting unit, which has a series impedance therein, and subsequent opening of the impedance interrupting unit effects an interruption of the residual current arc.

It is a further object of the present invention to improve upon the general arrangement set forth in the preceding paragraph not only as regards an improved mounting arrangement therefor, but, in addition, it is proposed to utilize in conjunction therewith a conducting bridging member, bridging a pair of interrupting assemblies each of the foregoing type, and in addition, serving as a disconnecting member, providing a pair of long isolated gaps within the pressurized enclosure in the fully open-circuit position.

A further object of the invention is to provide an improved compressed-gas circuit interrupter of the type utilizing a pressurized tank, into which extend one or more hollow terminal bushings, which may serve to support one or more interrupting assemblies disposed entirely within said pressurized tank.

Still a further object of the invention is to improve upon a compressed-gas circuit interrupter of the type specified in the preceding paragraph to eliminate noise and external demonstration during operation, in which exhausting of the gas blast, following its use against one or more arcs takes place into a low pressure exhaust chamber of substantial size, and the exhaust gas subsequently leaks through one or more hollow terminal bushings of relatively small size to the region surrounding the pressurized tank.

A further object of the invention is to provide a novel three-phase compressed-gas circuit interrupter utilizing a plurality of "dead" tanks, that is, tanks which are at ground potential, in which a single pneumatic operating mechanism is provided and effects actuating motion of an operating rod which extends between the several dead tanks and has one end thereof operatively connected with said pneumatic operating mechanism.

An ancillary object of the invention is to utilize as a storage reservoir of compressed gas for the pneumatic operating mechanism of the preceding paragraph one of the pressurized dead tanks, thereby eliminating any need for a separate storage reservoir of compressed gas for such pneumatic operating mechanism.

Yet a further object of the invention is to provide an improved compressed-gas circuit interrupter utilizing one or more terminal bushings extending interiorly within a pressurized dead tank, each of said hollow terminal bushings supporting an interrupting assembly, and in which exhaust of the compressed gas takes place through said one or more hollow terminal bushings, in which means are provided, including one or more valve control members, to control the exhausting of compressed gas out through said one or more hollow terminal bushings.

Another object of the invention is to provide an improved dump-valve means for initiating the operation of a compressed-gas breaker unit disposed in a pressurized dead tank, such that proper delay may be achieved to insure the opening of the contact structure and a blasting of compressed gas therethrough prior to a subsequent disconnecting operation.

Still a further object of the invention is to provide a dump-valve arrangement, such as the type specified in the preceding paragraph, in which assurance is had that the dump-valve arrangement will be operated to insure a proper sequence during a subsequent opening operation, even though the actuating bridging disconnecting member does not completely move to its fully closed-circuit position, but instead reverses its motion during a closing operation. As well known by those skilled in the art, such a reversal during the closing operation may occur when it is attempted to close the interrupter when fault current conditions exist on the connected transmission system.

Still a further object of the invention is to provide an improved contact arrangement for a compressed-gas circuit interrupter.

Still another object of the invention is to provide an improved contact arrangement for a compressed-gas circuit interrupter, in which one of the relatively stationary contacts includes a plurality of segmental finger contacts extending radially inwardly, the inner ends of such finger contacts serving as a variable orifice, through which an exhaust of compressed gas may take place.

Compressed-gas circuit interrupters for outdoor application have in the past been either enclosed in sheltering, heated structures, or have been enclosed in porcelain-clad casings for weather protection. Frequently the porcelain is used for insulation, weather protection, structural support and high-pressure air containers. However, more conservative designs use the porcelain for insulating and weather protection only. When current transformers and potential devices are required, they constitute separate and expensive pieces of equipment. The complete assemblies are, therefore, expensive, spacious, complicated and in many cases fragile and hazardous.

In United States Patent 2,507,210, which issued May 9, 1950 to Leon R. Ludwig and Benjamin P. Baker, entitled, "Gas Blast Circuit Breaker," and assigned to the assignee of the instant application, there is disclosed a number of pressurized tank arrangements providing compressed-gas circuit interrupters with particular advantages already obtained by the conventional dead tank oil circuit interrupters, such as structural stability, provided by a metallic dead tank and the convenience of utilizing bushing-type current transformers in connection with hollow terminal bushings extending into the dead tank. The designs set out in the foregoing patent attempted to overcome some of the disadvantages of compressed-gas circuit interrupters previously referred to. They suggest an arrangement which utilizes compressed air interrupters in cooperation with semi-conventional condenser bushings and in some cases of a metal-clad enclosure. In some of the arrangements disclosed in the aforesaid patent, the metallic enclosure is pressurized, while in other arrangements disclosed, it is maintained at atmospheric pressure.

Other of the arrangements disclosed in the aforesaid patent assume structures capable of interrupting a maximum of 20,000 to 25,000 amperes, which at 138 kv. would be a maximum of approximately 5,000,000 kva.

The present invention contemplates the construction of a novel type of high-voltage, compressed-air or gas circuit breaker suitable for indoor or outdoor application, which for one particular rating may be adapted for use on a 138 kv., 10,000,000 kva. system. The normal current through such a device might be 2000 amperes, and the interrupting rating in RMS amperes at rated voltagle may approach 50,000 amperes. The compressed-gas circuit interrupter of the present invention may have an interrupting time of 3 cycles, with a closing time, or a reclosing time, of 20 cycles.

It is desired to provide such a compressed-gas circuit interrupter which may have an operating air pressure of around 250 pounds per square inch, and which has a storage capacity in each of the pressurized tanks sufficient to accommodate at least two opening operations without replenishing air or gas.

It is a still further object of the present invention to improve upon the construction set out in the foregoing patent, and to considerably extend its range of interrupting capacity to accommodate considerably higher voltages and greater current interrupting ability than that disclosed by the interrupter illustrated in the aforesaid patent.

Further objects and advantages will readily become apparent upon reading the following specification, taken in conjunction with the accompanying drawings, in which.

Figure 7:
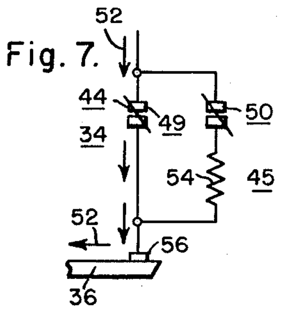
Figure 8:
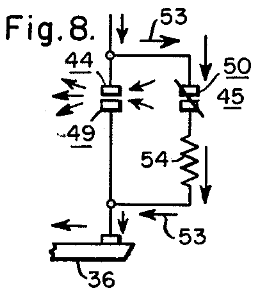
Figure 9:
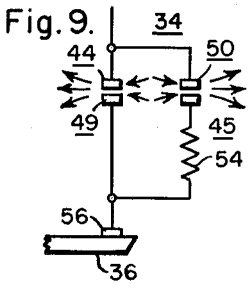
Figure 10:
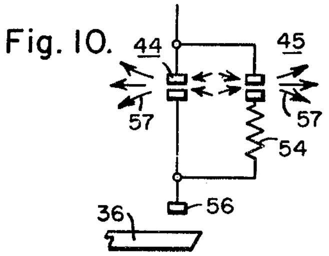

Fig. 7 diagrammatically illustrates the current flow through one interrupting assembly in the closed-circuit position of the interrupter;

Fig. 8 diagrammatically illustrates the initial opening of the main contacts associated with the main current interrupting unit, during the initial portion of the opening operation;

Fig. 9 diagrammatically represents the interruption of the current through the impedance interrupting unit at a subsequent stage in the opening operation;

Fig. 10 diagrammatically represents the conditions which take place following a separation of the lower bridging member from the disconnecting contacts of the interrupting assembly, while the continuing gas blast maintains the circuit open at the main current interrupting unit and at the impedance interrupting unit.

Figure 3:
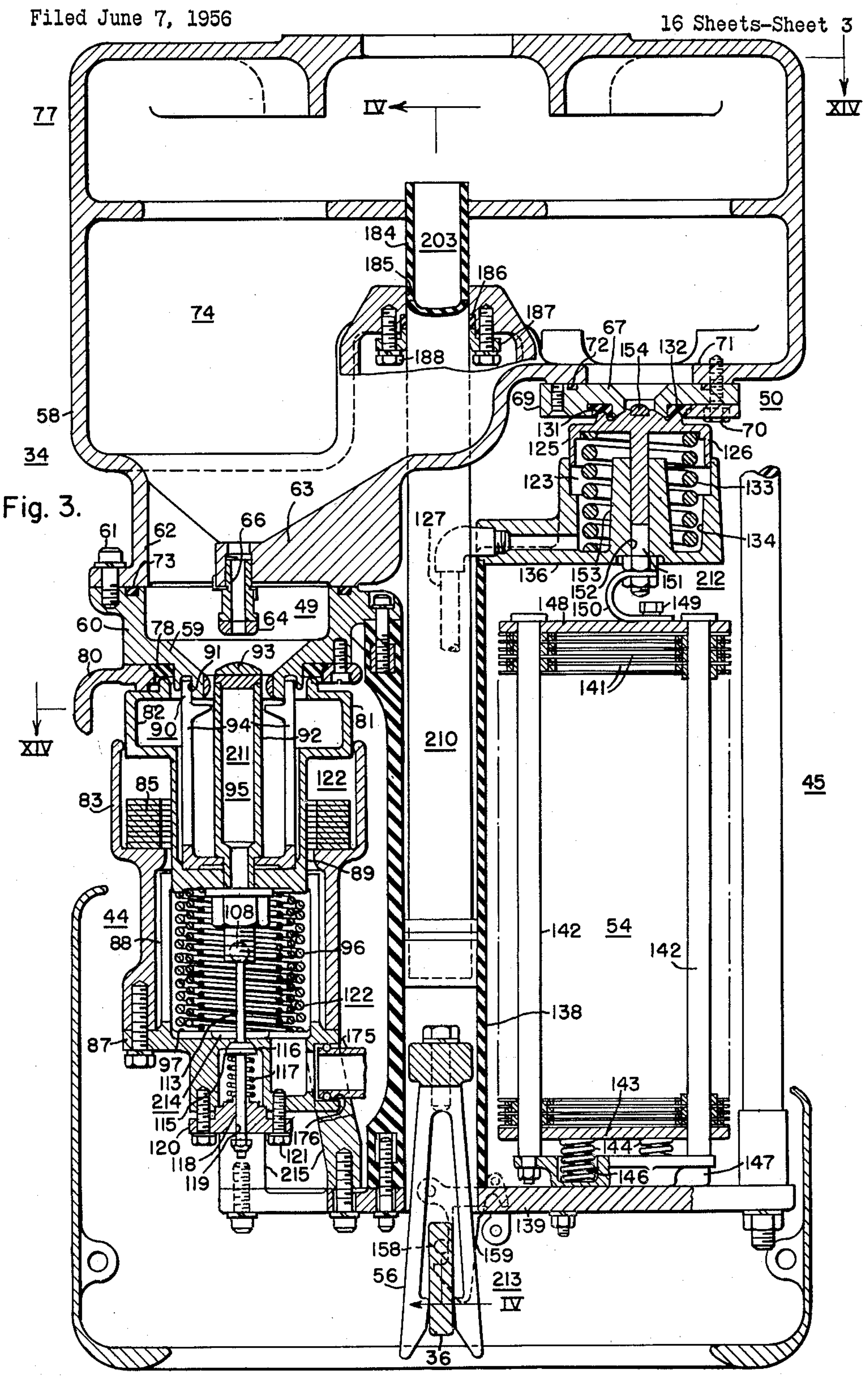
Fig. 3 is an enlarged, vertical sectional view taken through the right-hand interrupting assembly of the pole unit illustrated in Fig. 2, substantially along the line III—III of Fig. 2.
Figure 11:
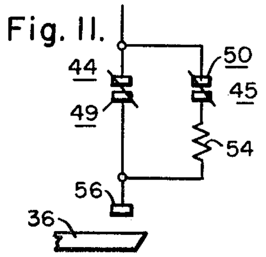
Figure 12:
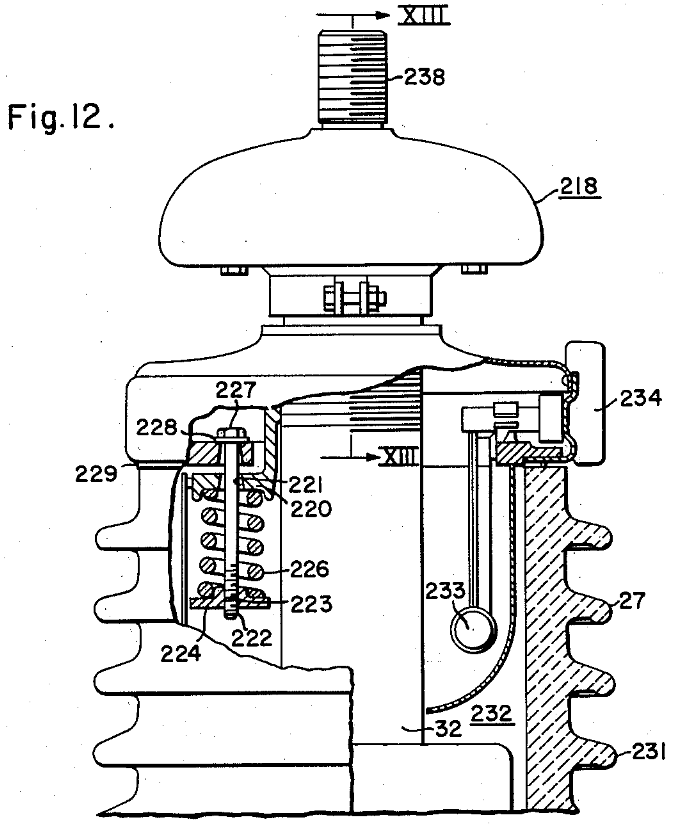
Figure 13:
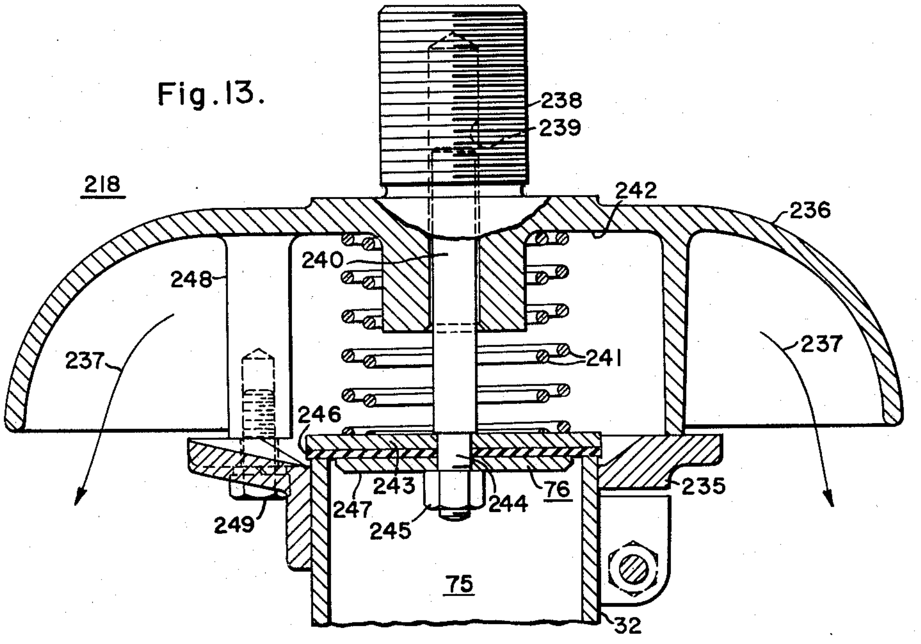
Figure 14:
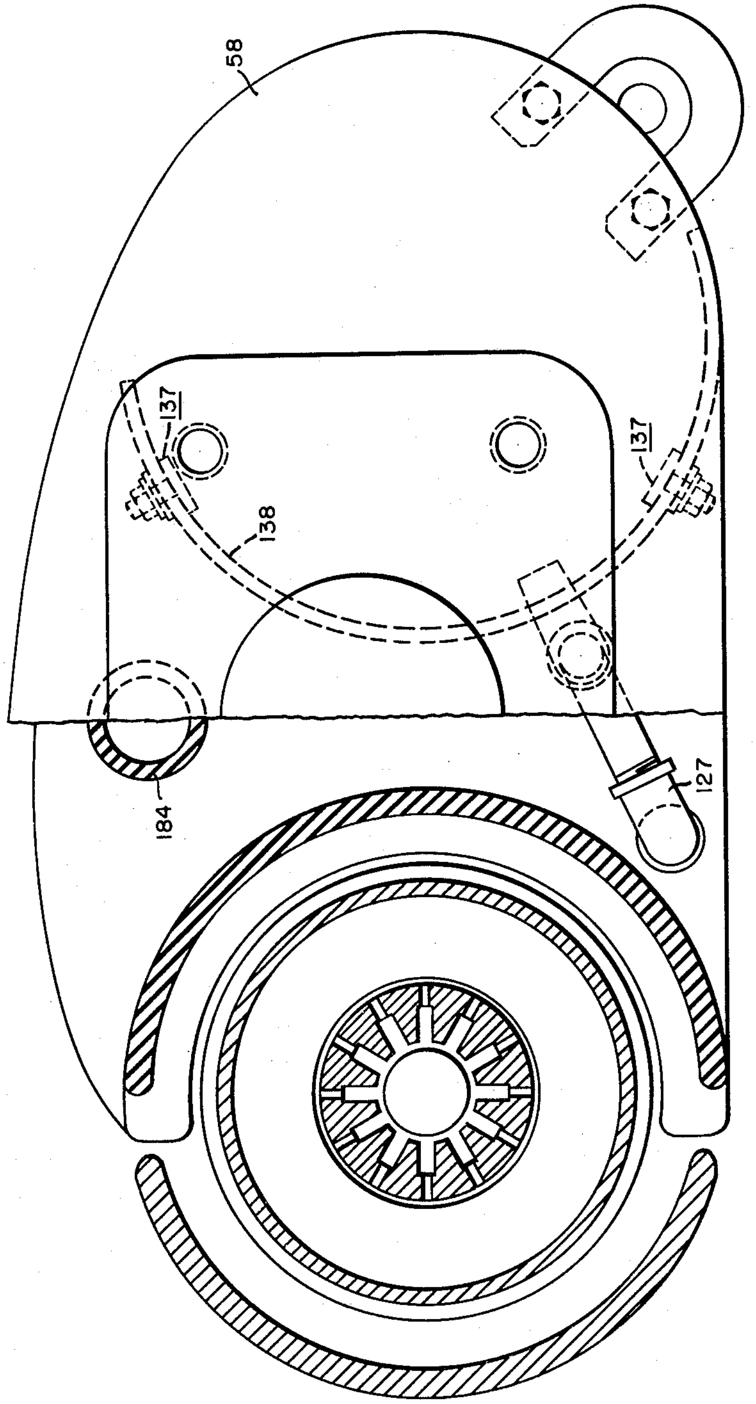
Figure 15:
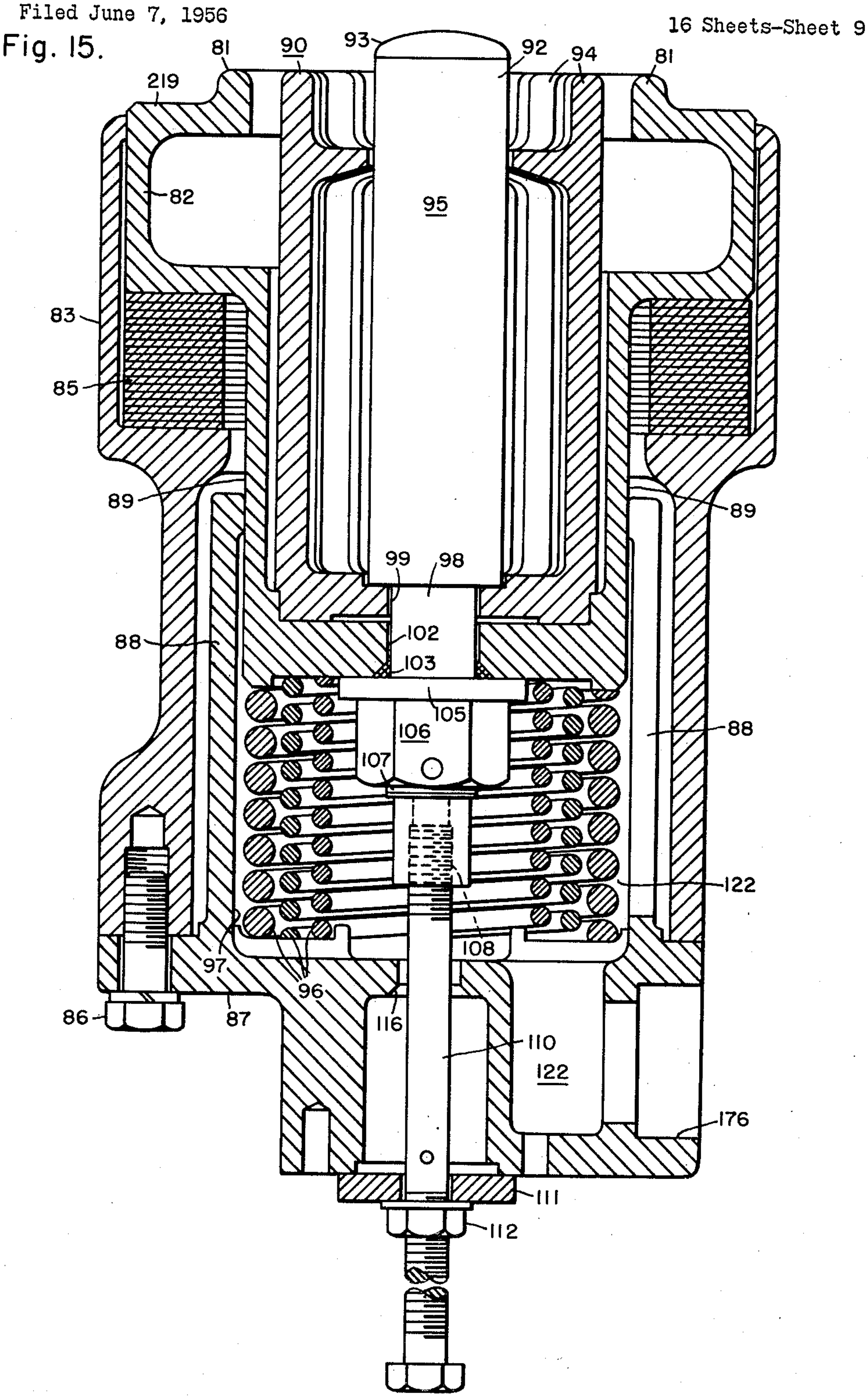
Figure 16:
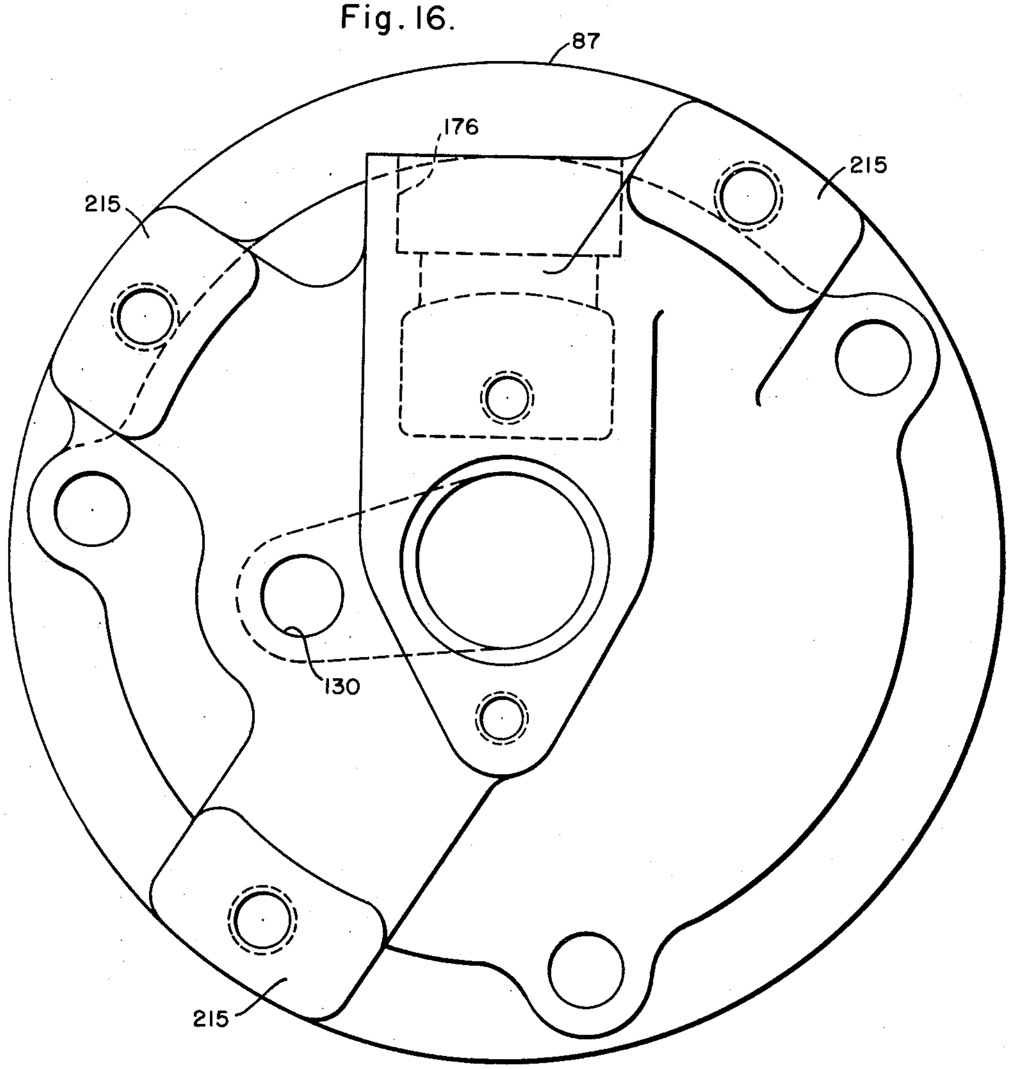
Figure 17:
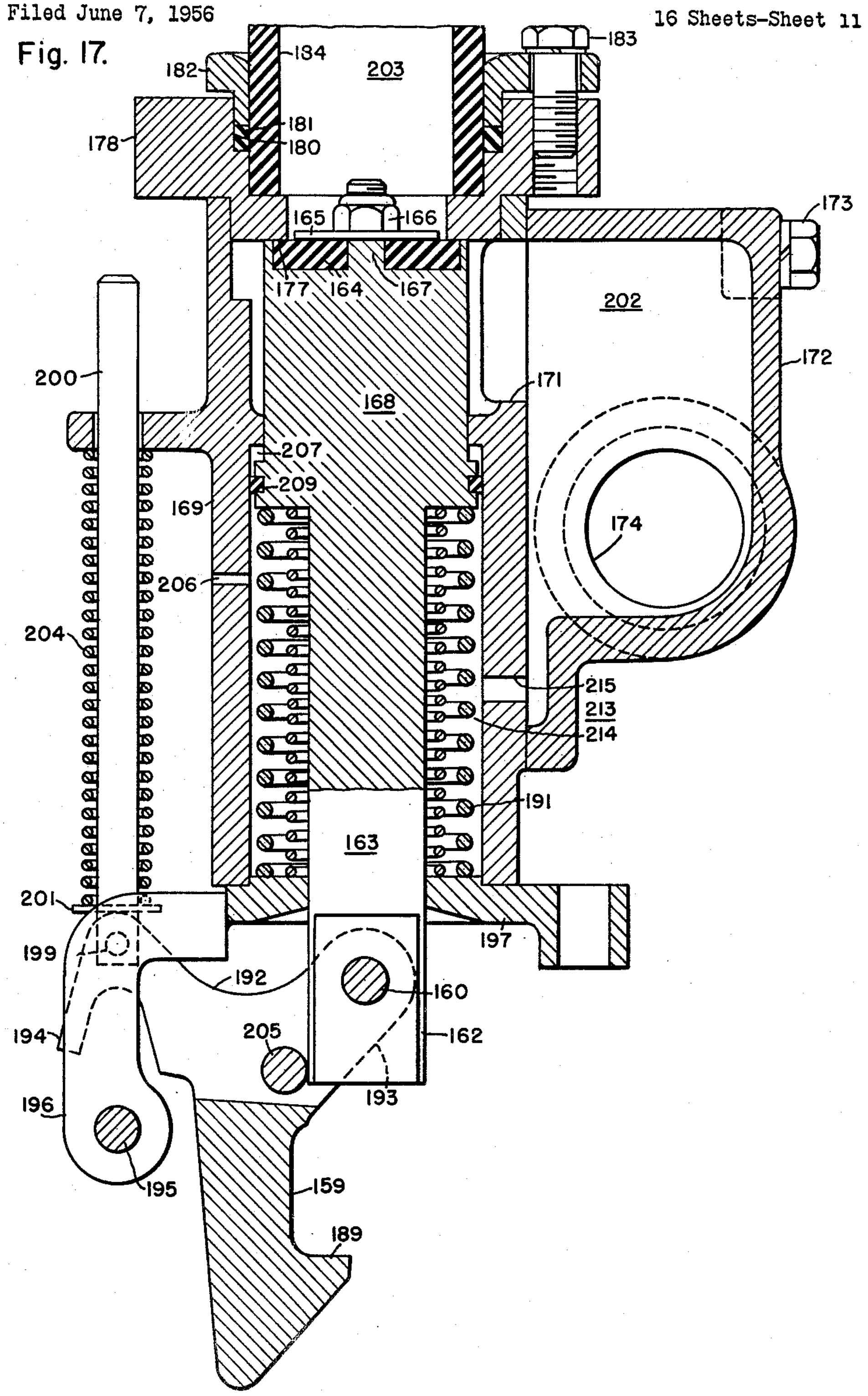
Figure 18:
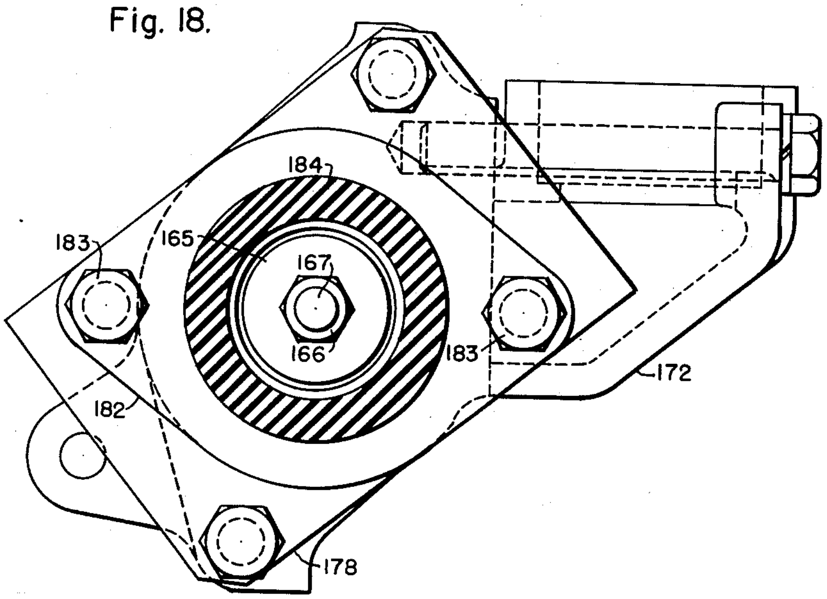
Figure 19:
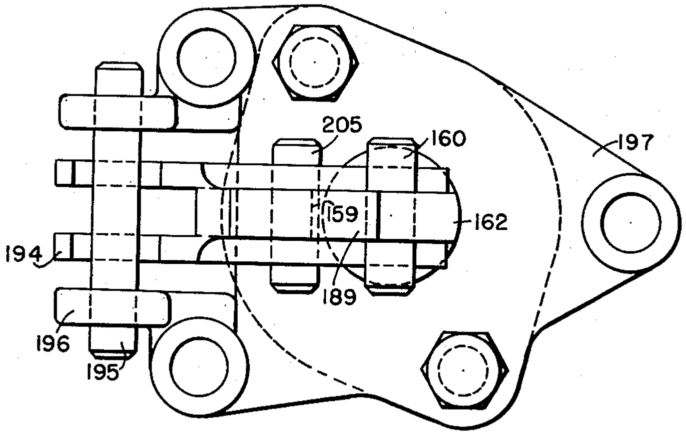
Figure 20:
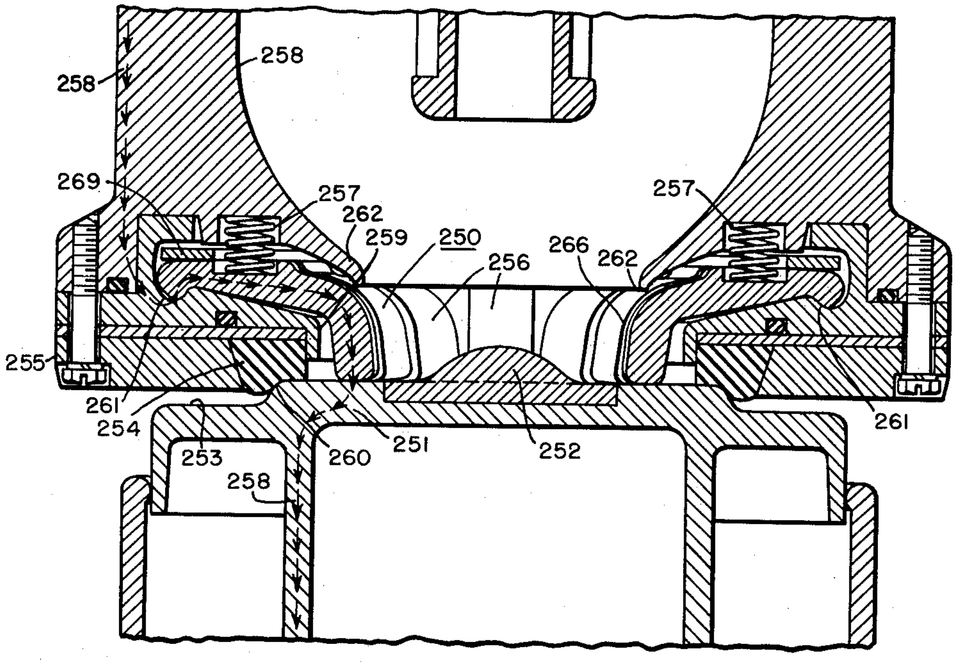
Figure 21:
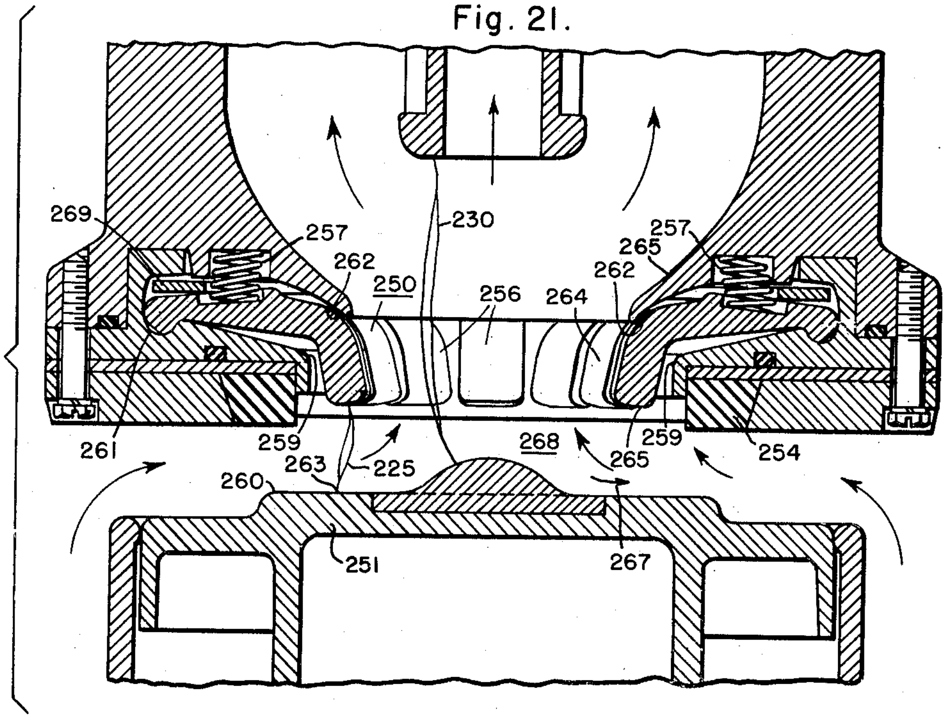
Figure 22:
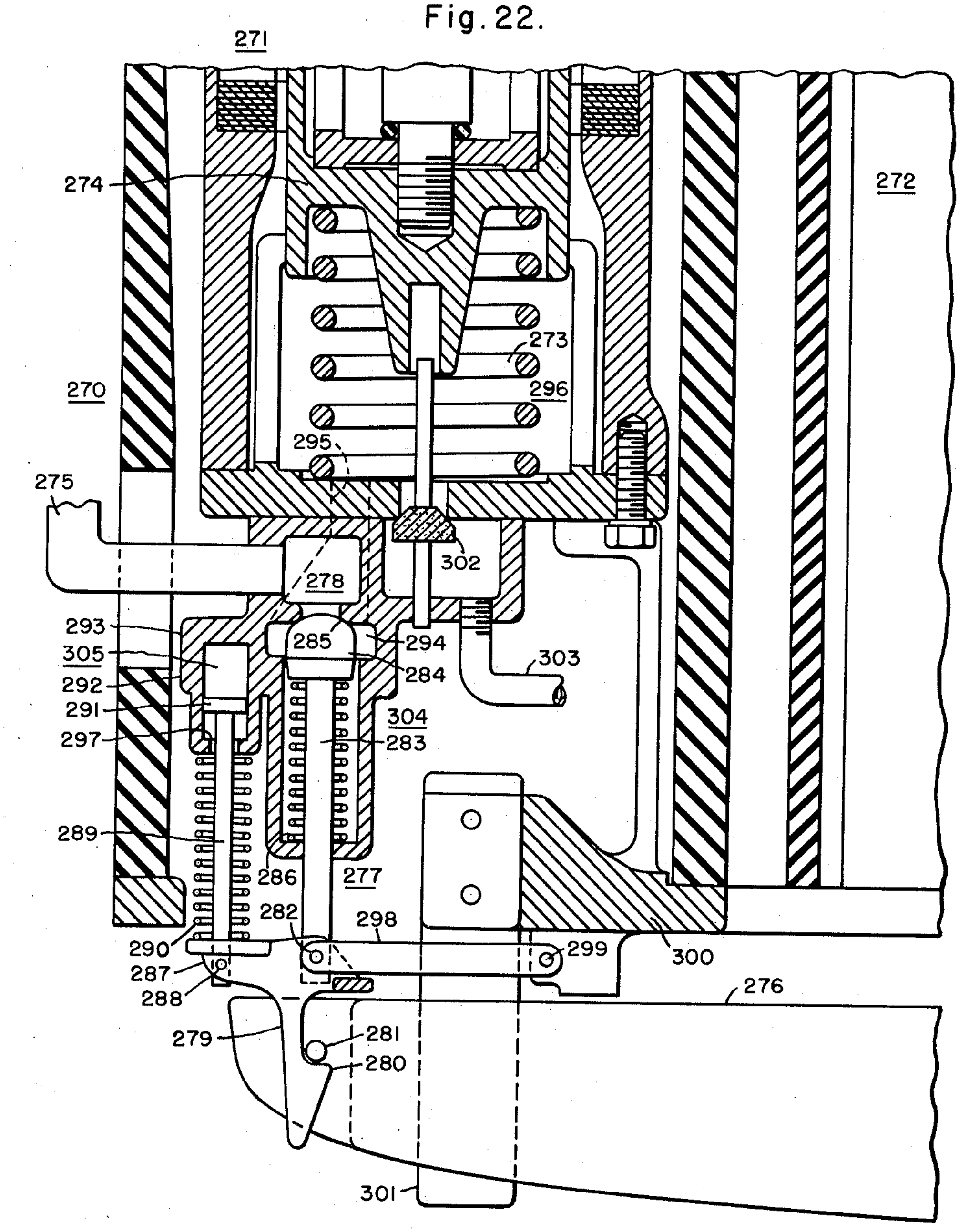
Figure 23:
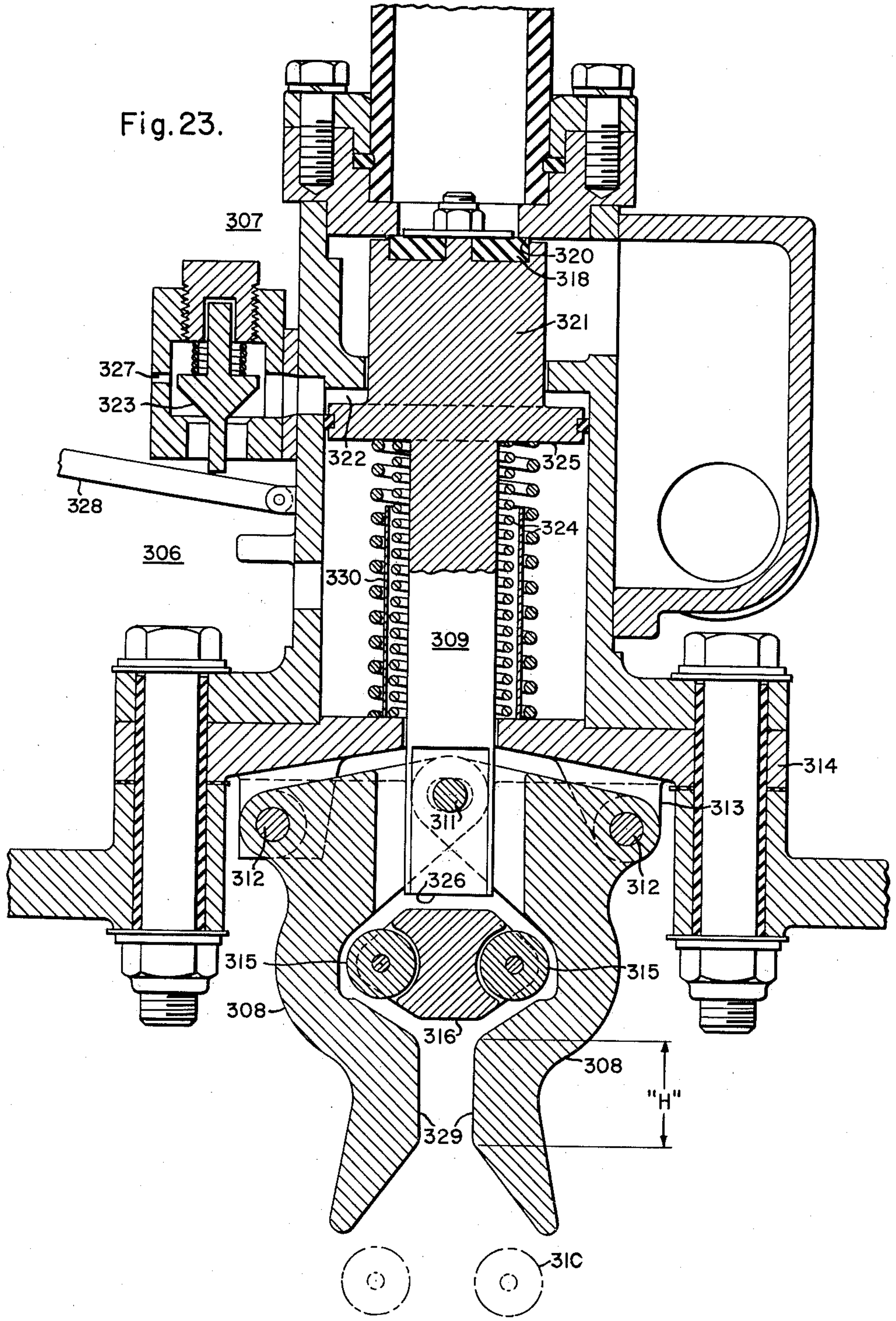
Figure 24:
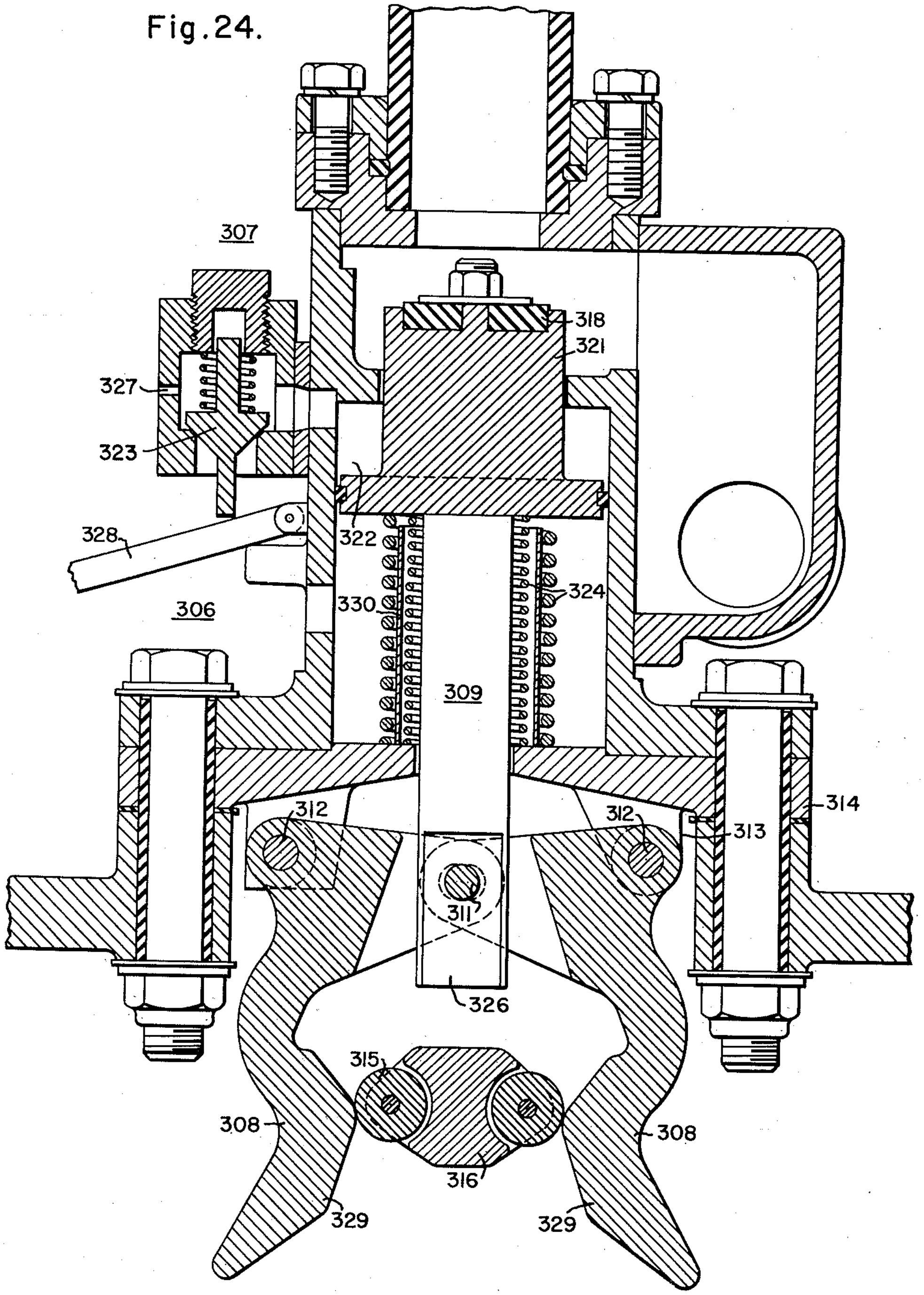

Fig. 11 diagrammatically illustrates the fully open-circuit position of the interrupter wherein there is a reclosure of the contacts in the main current and impedance interrupting units and the disconnecting gap is provided by the bridging member;

Fig. 12 fragmentarily, and in enlarged fashion, illustrates the upper, outer end of one of the hollow terminal bushings extending into the pressurized tank, a portion of the porcelain casing being broken away to illustrate the oil gauge and also the compression-spring arrangement for the porcelain casings;

Fig. 13 is a considerably enlarged, fragmentary, sectional view, taken along the line XIII—XIII of Fig. 12, illustrating the control valve utilized at the outer end of the hollow terminal stud;

Fig. 14 is a plan view, partially in section, taken substantially along the line XIV—XIV of Fig. 3;

Fig. 15 is a vertical sectional view through one of the movable main contacts of the main current interrupting unit, and showing the use of an assembly tool, which may be utilized during the assembly of the contact structure;

Fig. 16 is a bottom view of one of the dump-valve castings utilized in the operating arrangement for the movable main contact illustrated in Fig. 15;

Fig. 17 is a considerably enlarged view of the dump-valve arrangement and the latch therefor, which is operated by the conducting bridging member, the dump valve being illustrated in the closed position;

Fig. 18 is a top plan view of the dump-valve arrangement illustrated in Fig. 17;

Fig. 19 is a bottom plan view of the same dump-valve arrangement of Figs. 17 and 18;

Fig. 20 illustrates a modified type of orifice contact arrangement, which may be utilized in place of the main current contact structure of the main current interrupting unit, the contacts being illustrated in the closed-circuit position;

Fig. 21 is a view similar to that of Fig. 20, but illustrating the open-circuit position of the contact structure;

Fig. 22 is a fragmentary, vertical sectional view through a modified type of interrupting assembly, in which a modified type of dump-valve arrangement, having a time delay means, is employed with the conducting bridging member, the contact structure being illustrated in the fully closed-circuit position;

Fig. 23 illustrates a modified type of dump-valve arrangement, which may take the place of the dump-valve arrangement of Figs. 17–19, and which insures an operation of the dump-valve arrangement even though the bridging member does not move to the completely closed-circuit position, the dump-valve arrangement being illustrated in the closed position; and Fig. 24 illustrates the state of affairs of the dump-valve arrangement of Fig. 23 when the conducting bridging member does not move to its completely closed-circuit position, but reverses its movement near the end of the closing stroke, the view illustrating the operation of the dump valve under such conditions.

Figure 1:
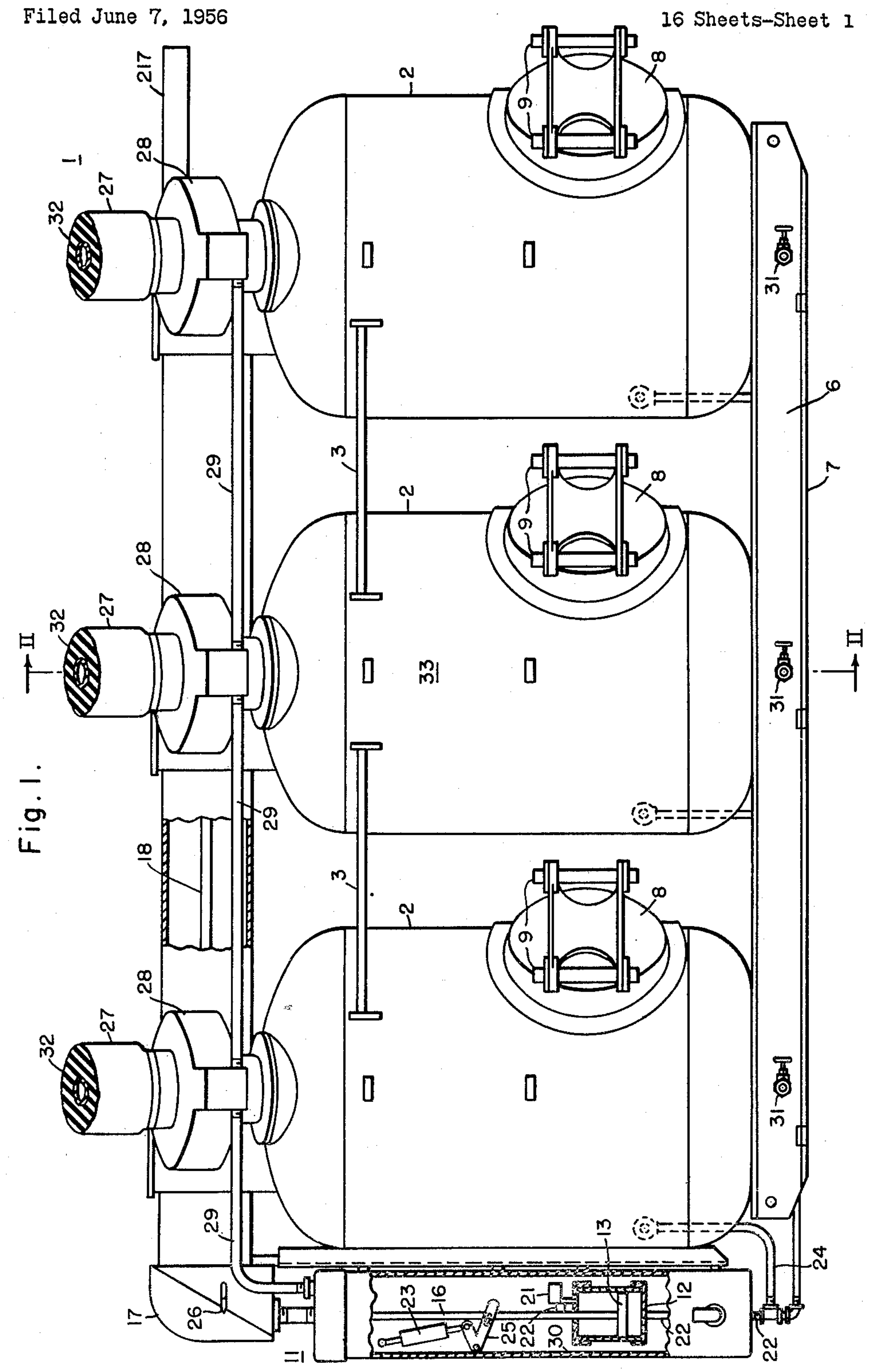
Figure 1 is a fragmentary, side elevational view of a three-phase compressed-gas circuit interrupter embodying the principles of the present invention, a portion of the pneumatic mechanism being broken away and schematically illustrated, to indicate the type of pneumatic mechanism utilized, the breaker being shown in the closed-circuit position.

Referring to the drawings, and more particularly to Fig. 1 thereof, the reference numeral 1 generally designates a three-phase, compressed-gas circuit interrupter, which controls the three phases of a transmission system. As illustrated, the three-phase compressed-gas circuit interrupter 1 includes a plurality of, in this particular instance three, pressurized tanks or enclosures 2, one for each pole unit of the interrupter. It will be noted that tie rods 3 space the pressurized tanks 2 apart a fixed distance, and that the three pressurized tanks 2 rest upon a steel base structure 6, which includes a pair of laterally spaced flanged steel sleds 7, only one of which is shown, which may be utilized for dragging the circuit interrupter 1 as a unitary structure to a suitable mounting position.

Each of the tanks 2 includes a manhole cover 8, which is maintained in the closed position by a pair of pivot pins 9, so that upon removal of one of the pivot pins 9, the manhole cover 8 may be rotated horizontally about the other pivot pin 9 to enable entrance into the interior of the tank 2 by a maintenance attendant.

A pneumatic mechanism 11 is provided, which is secured to the left-hand pole unit of the interrupter 1, as viewed in Fig. 1. The pneumatic mechanism includes an operating cylinder 12 and a piston 13, which is connected to the lower end of a link 16. The link 16 is, in turn, connected to a bell-crank lever, not shown, which is disposed interiorly within a housing 17. The other end of the bell-crank lever is utilized to effect longitudinal, horizontal motion of an operating rod 18, which simultaneously actuates the interrupting assemblies within each of the three tanks 2. It will be noted that the closing valve 21, diagrammatically illustrated, utilizes compressed air taken through a conduit 22 fed from a pipe 24 leading from one of the tanks 2, in this instance the nearest tank, to which the pneumatic mechanism 11 is attached. This has the advantage that the tank 2 provides a storage tank not only for the interrupting assemblies which it encloses, but also serves as a storage tank for the operation of the pneumatic mechanism 11.

Associated with the link 16 through a bell-crank 25 is a set of shock absorbers 23, diagrammatically illustrated, which have a function more fully described hereinafter. An indicator 26 is used to indicate the fully opened or fully closed positions of the interrupter 1. Associated with each of the hollow terminal bushings 27 is a bushing type current transformer 28, the connections to which pass through a horizontally extending conduit 29 to relay mechanism interiorly of the housing 30 for the pneumatic mechanism 11. Each of the tanks 2 has a valve 31 associated therewith to permit the release of pressure from within the respective tank 2. It will be observed that each hollow terminal bushing 27 has a hollow terminal stud 32 associated therewith, constituting an exhaust conduit leading out of the pressurized tank 2.

Figure 2:
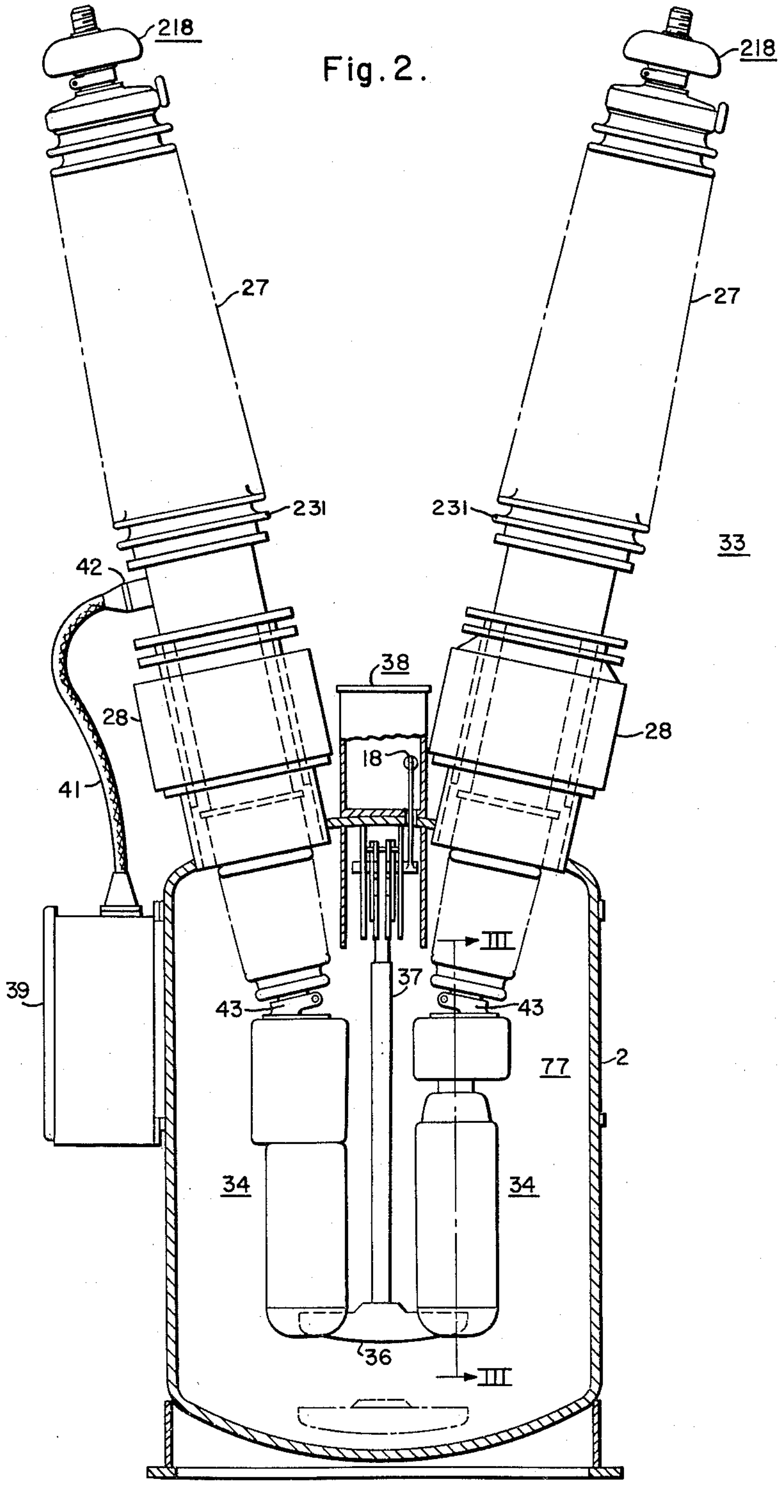
Fig. 2 is a vertical sectional view taken through one of the three-pole units of the three-phase interrupter shown in Fig. 1, substantially along the line II—II of Fig. 1, looking in the direction of the arrows, and the interrupter being illustrated in the fully closed-circuit position.

Referring next to the pole unit 33, illustrated in Fig. 2, which may be the middle pole unit of the three-phase compressed-gas circuit interrupter 1, it will be observed that disposed interiorly within the enclosure or tank 2 are a pair of interrupting assemblies 34, which are electrically interconnected by a conducting bridging member 36. The conducting bridging member 36 is vertically actuated in a reciprocal manner by an insulating lift rod 37, which may be connected to a straight line linkage 38, which may be of the type illustrated in United States Patent 2,743,337. The linkage 38 is, in turn, connected to the horizontally movable operating rod 18.

Secured to the left-hand side of the tank 2, as viewed in Fig. 2, is a potential device 39 having a connection 41 with a suitable potential tap 42 provided by the terminal bushing 27.

It will be observed that associated with the inner end of each hollow terminal bushing 27 is a contact foot 43, which serves to support the interrupting assembly 34 fixedly in place to the lower interior end of the hollow terminal stud 32 (Fig. 1). As more fully described hereinafter, the hollow terminal stud 32 serves as an exhaust conduit for accommodating the exhausting of gases out of the tank 2 during the opening operation.

Figure 6:
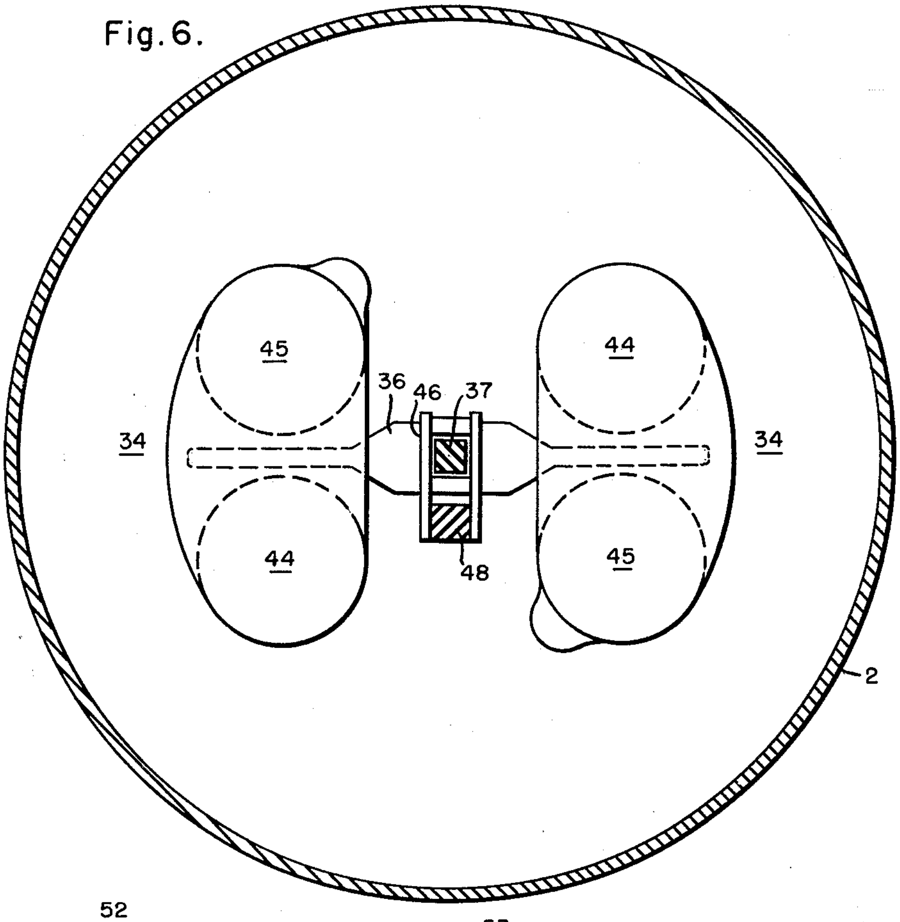
Fig. 6 is a somewhat diagrammatic view illustrating a plan view of one pole unit of the interrupter, diagrammatically indicating the relative positions of the two main current interrupting units and the two impedance interrupting units which are associated with the two interrupting assemblies, which are suspended within the pressurized tank.

Fig. 6 more clearly shows the disposition of the main current interrupting unit 44 and the impedance interrupting unit 45 at the lower end of each terminal bushing 27. As illustrated in Fig. 6, the conducting bridging member 36, moved upwardly by the lift rod 37, may be guided in a straight line vertical direction by a guide support 46, the latter being affixed to an insulating vertically extending brace 48.

As illustrated in Fig. 6, and as shown more in detail in Fig. 3, the main current interrupting unit 44 and the impedance interrupting unit 45 are in electrical parallel relationship. The reason for this is more apparent from an inspection of Figs. 7–11 of the drawings.

Referring to Fig. 7, it will be observed that the bridging member 36 makes contact with the lower end of the interrupting assembly 34. The relatively movable contact structure 49 of the main current interrupting unit 44 is closed. Also the relatively movable contact structure 50 of the impedance interrupting unit 45 is also closed. It is obvious, therefore, that in the closed-circuit position of the interrupter that the current passes through the main current interrupting unit 44 in the manner indicated by the arrows 52.

Fig. 8 shows the state of affairs during the initial portion of the opening operation, when the bridging member 36 moves downwardly slightly to effect opening of the movable contact structure 49 in a manner described hereinafter, and thereby causes a blast of gas to flow through the contact structure 49 and extinguish the main current arc. This action forces the current to flow through the impedance interrupting unit 45 in a manner indicated by the arrows 53. However, because of the presence of the impedance 54, the amperage of the current is considerably reduced and the power factor is improved.

Fig. 9 illustrates the conditions arising when the relatively movable contact structure 50 of the impedance interrupting unit 45 opens, by means hereinafter described, to thereby effect a blasting of the residual current arc drawn at the contact structure 50 effecting its extinction. It will be noted that the bridging member 36 still continues to make contact with the disconnecting fingers 56 of the interrupting assembly, but current flow through the interrupting assembly 34 has ceased.

Fig. 10 illustrates a subsequent step in the opening operation where the bridging member 36 has parted contact with the disconnecting fingers 56, but during this time the gas blast, indicated by the arrows 57, continues to prevent any arc reignition and to maintain the circuit open.

Fig. 11 illustrates the fully open-circuit position of the interrupter when, by means hereinafter described, the gas blast has ceased, and the contact structure 49, 50 has reclosed. However, the isolating gap between the end of the bridging member 36 and the disconnecting fingers 56 is sufficient to hold the voltage and to maintain the circuit open. It will be obvious that during a closing operation the bridging member 36 will move upwardly, and the moment it contacts the disconnecting fingers 56 there will be an immediate re-establishment of the circuit through the interrupting assembly 34, since the relatively movable contact structures 49, 50 associated respectively with the main current interrupting unit 44 and the impedance interrupting unit 45 will already have been closed.

Figure 4:
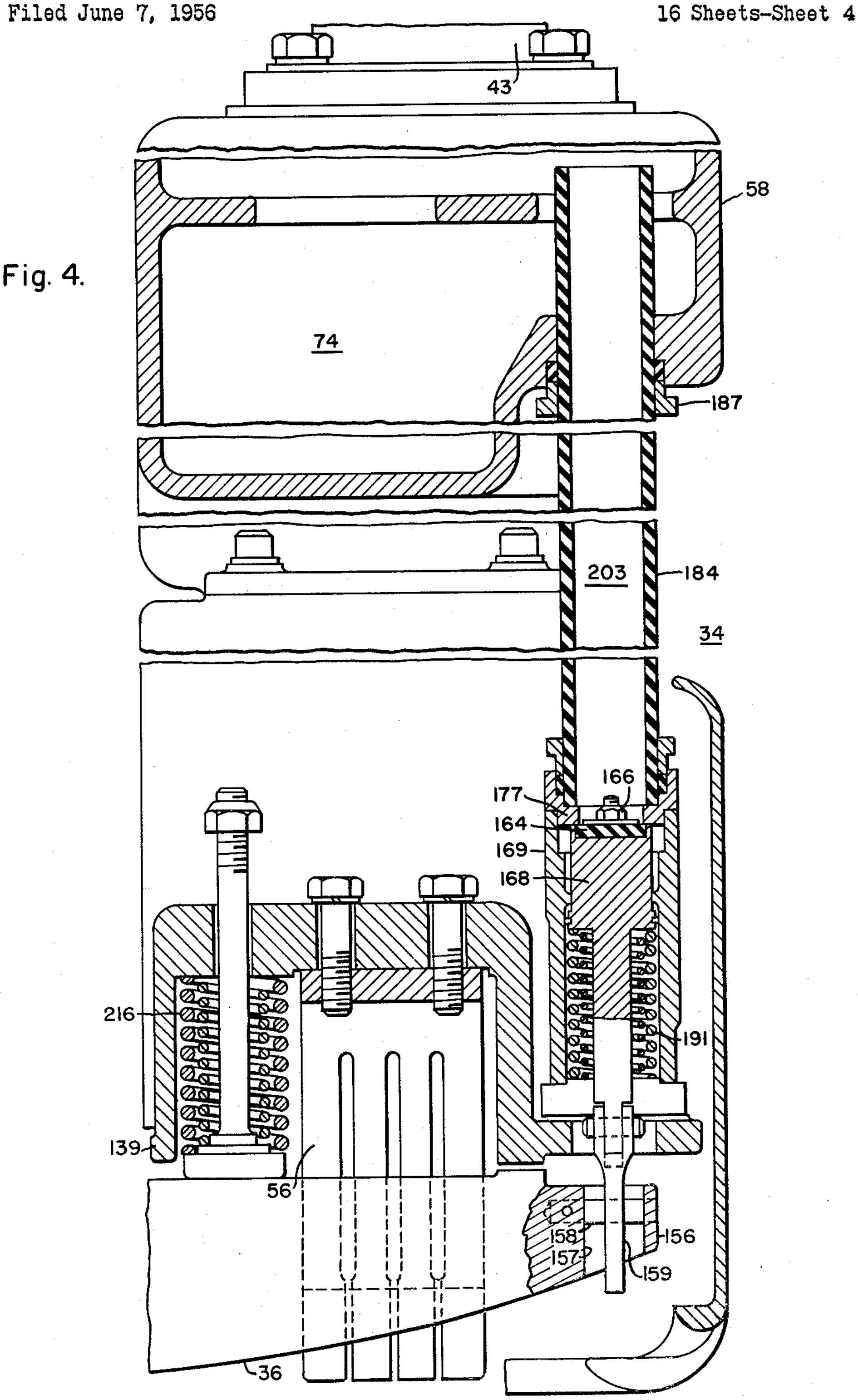
Fig. 4 is a vertical sectional view taken substantially along the line IV—IV of Fig. 3, the contact structure being illustrated in the closed-circuit position.
Figure 5:
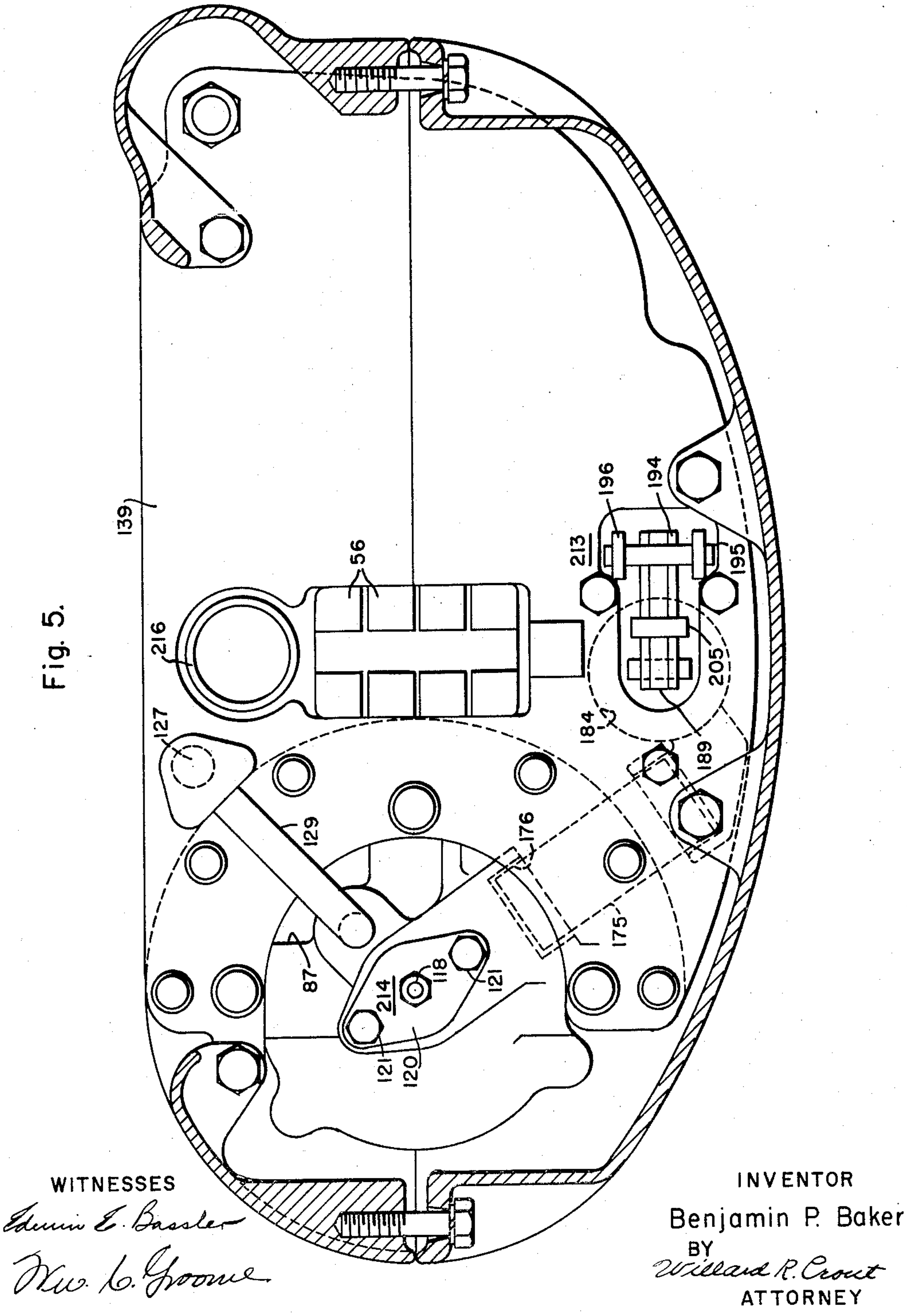
Fig. 5 is an inverted plan view of the interrupting assembly illustrated in Fig. 3.

Referring more particularly to Figs. 3–5, it will be noted, referring particularly to Fig. 4, that the contact foot 43 is fixedly bolted to a hollow exhaust chamber 58. The hollow exhaust chamber 58 is in free communication with the region interiorly of the hollow terminal bushing 27. Secured to the lower end of the hollow exhaust chamber 58 is a relatively stationary orifice contact 59 constituting a part of the relatively movable contact structure 49 of the main current interrupting unit 44. The relatively stationary orifice contact 59 is provided by an orifice plate 60, which is bolted as at 61 to the lower end 62 of the exhaust chamber 58. This lower end of the exhaust chamber 58 has one or more ribs 63 integrally formed therewith, which serve to hold fixedly in position an arc terminal 64, the function of which will be described hereinafter. Preferably the arc terminal 64 has a bore 66 passing therethrough to assist in arc extinction and to provide less resistance to the exhaust of gas.

Associated with the other side of the exhaust chamber 58, as viewed in Fig. 3, is a relatively stationary orifice contact 67, constituting a part of the relatively movable contact structure 50 of the impedance interrupting unit 45. This relatively stationary orifice contact 67 is provided by an orifice plate 69 bolted by bolts 70 to an apertured wall 71 of the exhaust chamber 58. As shown, gaskets 72 and 73 associated with the orifice plates 69 and 60, respectively, insure a gas-tight connection. As mentioned previously, the pressure within the tank 2, and consequently in the region around the interrupting assemblies 34, is at a relatively high pressure, say 250 pounds per square inch. The pressure within the region 74 of the hollow exhaust chamber 58 and in the region 75 (Fig. 13) within the hollow terminal stud 32, is at a considerably lower pressure, say two or three atmospheres gauge, as controlled by the control valve 76 (Fig. 13). As mentioned heretofore, there is a free communication from the region 74 within the exhaust chamber 58 through the contact foot 43 and into the interior 75 of the hollow terminal stud 32. It is, therefore, necessary to insure a gas-tight seal between the region 77 within the tank 2 and the region 74 within the hollow exhaust chamber 58.

Encircling the relatively stationary orifice contact 59 is a gasket 78 serving as a blast valve seat, which is retained in place by a retaining ring 80. Cooperating with the blast valve seat 78 is a movable blast valve 81, more clearly shown in Fig. 15 of the drawings. As shown in Fig. 15, the movable blast valve 81 constitutes the upper portion of a first piston member 82, which slides within an operating cylinder 83. The first piston member 82 is adapted to strike a plurality of shock washers 85 at the end of the opening stroke. As shown in Fig. 15, the operating cylinder 83 is bolted, by one or more bolts 86, to a dump-valve casting 87, a bottom plan view of which is illustrated in Fig. 16 of the drawings. The dump-valve casting 87 is provided with a plurality of upstanding fingers 88, which bear against a side wall portion 89 of the first piston member 82 to collect current therefrom. Disposed interiorly of the first piston member 82 is an annular segmental main contact 90, having fingers 94, which in the closed-circuit position of the interrupter, contact a vertical wall surface 91 of the orifice plate 60. Thus the main current, which passes through the relatively movable contact structure 49 of the main current interrupting unit 44, passes between the annular main contact 90 comprising resilient fingers 94 and the vertical wall portion 91 of the orifice plate 60.

Disposed concentrically within the annular main contact 90 is a rod-shaped arcing contact, or stud 92 having an upper arc-resisting portion 93. The arc-resisting portion 93 cooperates with the aforementioned arcing terminal 64 to locate the main current arc axially through the orifice of the orifice contact 59.

Biasing the main movable contact 95, comprising the annular main contact 90 and the arcing contact 92, in an upward closing direction is a battery of compression springs 96, having their lower ends seated within a recess 97 of the dump valve casting 87. The springs 96 constitute a biasing means to maintain the relatively movable contact structure 49 closed except when compressed gas is dumped from the rear side of the first piston member 82 by operation of a first dump-valve means, hereinafter described.

As shown in Fig. 15, the rod-shaped arcing contact 92 has a reduced extension 98 which passes through an aperture 99 in main contact 90, and which also passes through an aperture 102 provided at the lower end of the first piston member 82. A packing 103 and a gland 105 insure a gas-tight connection of the reduced portion 98 through the apertures 99, 102. A nut 106 threaded along a threaded portion 107 of the reduced stem 98 compresses the packing 103. The lower end of the stem 98 has a recess 108 interiorly provided with threads, which may accommodate a threaded tool 110 utilized in the assembly process to compress the springs 96. The threaded tool 110, shown in Fig. 15, has a stop washer 111 bearing against the bottom of the casting 87 and serving as a base for the rotation of a nut 112 which will effect downward travel of the drawing tool 110. In other words, to effect the contraction of the springs 96 during an assembly or a disassembly operation, the threaded tool 110 is threaded into the recess 108 of the stem 98. Then the nut 112 is rotated, and, bearing against the stop washer 111, effects a downward retracting movement of the threaded tool 110 compressing the springs 96 and lowering the main movable contact 95 to the position shown in Fig. 15.

During the actual operation of the interrupter, the tool 110, of course, is not utilized, and, as viewed in Fig. 3, the cavity 108 in the stem 98 may strike a valve stem 113 of a second dump valve 115 biased to its closed position against a valve seat 116 (Fig. 15) by a compression spring 117. The second dump valve 115 has a lower guide stem portion 118, which is guided through an aperture 119 provided in a lower cap 120, as shown more clearly in Figs. 3 and 5 of the drawings. The lower cap 120 is secured by bolts 121 (Fig. 3) to the dump valve casting 87.

The actuation of the second dump valve 115 by opening movement of the main movable contact 95 effects an intercommunication between the region 122 under the first piston 82 and the region 123 under a second piston member 125 associated with a movable impedance contact 126, more clearly shown in Fig. 3 of the drawings. This is brought about by an exhaust pipe 127 which connects with a second pipe 129 (Fig. 5) which communicates through an aperture 130 (Fig. 16) of the dump-valve casting 87.

The movable impedance contact 126 also includes an annular blast valve portion 131, which cooperates with a blast-valve seat 132 provided by a gasket and inserted within the orifice plate 69.

The movable impedance contact 126 is biased upwardly toward its closed position by a compression spring 133 having its lower end seated within a cavity 134 provided in an operating cylinder casting 136. This casting 136 is secured by clamp lugs 137 (Fig. 14) to a semi-cylindrically-shaped insulating support plate 138. The lower end of the support plate 138 is secured by similar clamp lugs 137, not shown, to a lower base casting plate 139. Disposed between the operating cylinder casting 136 and the bottom casting 139 is an impedance assembly 54, in this particular instance including a plurality of resistor grids 141. These resistor grids 141 are stacked in superimposed relation upon a pair of insulating tie rods 142 and are maintained in the compressed condition by a spring plate 143, which slides upon the tie rods 142, and which serves as an upper seat for a plurality of compression springs 144. The lower ends of the compression springs 144 seat in a plurality of recesses 146 provided in a base casting 147, to which is secured the lower ends of the tie rods 142.

Each resistor grid 141 is in a zigzag shape, and the general method of interconnecting the resistor grids 141 is described and illustrated in United States Patent 2,632,078. Reference may be had to this patent for a detailed knowledge of the method of assembly and construction of the resistor grids 141, which construction forms no part of the present invention. It will be noted, however, that the upper plate 148 of the resistor assembly 54 has a terminal stud 149, to which is secured a flexible connector 150. The other end of the flexible connector 150 is clamped to the lower threaded end of the contact stud 151 of movable impedance contact 126, which passes through an aperture 152 of an upstanding guide portion 153 of the casting 136.

At the upper end of the movable impedance contact 126 is an arc-resisting tip portion 154, which serves as an arc terminal during the opening operation.

The dump-valve means for exhausting high-pressure gas from the region 122 below the first piston member 82 will now be described. As mentioned previously, a conducting bridging member 36 electrically interconnects the two interrupting assemblies 34. As noted in connection with Fig. 4, the outer extremity 156 of the bridging member 36 has a vertical hole 157 provided therein. A latching pin 158 is fixedly secured diametrically across the hole 157 and is used to latch on to a latch member 159, the configuration of which is more readily apparent from an inspection of Fig. 17 of the drawings. The latch member 159 is pivotally secured, by a pivot pin 160, to a lower flattened portion 162 of a dump-valve stem 163. The upper end of the dump-valve stem 163 actuates a first dump valve 164, comprising an annular gasket member retained in place by a washer 165 and a nut 166 threaded about an upper threaded extension 167 of the valve body 168. The first dump valve 164 slides within a valve casing 169 having a lateral outlet opening 171. The opening 171 communicates with a connector 172 bolted, as at 173, to the valve casing 169. The connector 172 has an opening 174, within which is secured a dump-valve pipe 175, more clearly shown in Fig. 5 of the drawings.

The dump-valve pipe 175 is secured into an opening 176 of the dump-valve casting 87, and hence communicates with the region 122 below the first piston member 82.

Referring again to Fig. 17, the first dump valve 164 cooperates with a valve seat 177 provided by a cap 178 having a recess 180, within which is a packing 181 compressed by a gland 182. The gland 182 is bolted into place by bolts 183. The gland 182 and the cap 178 surround the lower end of a conduit 184, which extends upwardly between the main current interrupting unit 44 and the impedance interrupting unit 45 and leads into the hollow exhaust chamber 58. Referring to Fig. 3 in this connection, it will be observed that the upper end of the conduit 184 extends through an aperture 185 of the exhaust chamber casting 58, and a packing 186 and a gland 187 secured by bolts 188 insures a gas-tight connection thereat.

As mentioned previously, the latching pin 158 associated with the extremity 156 of the conducting bridging member 36 latches to a nose 189 of a latching member 159 and forces the first dump-valve member 164 downwardly against the upward biasing action exerted by a battery of compression springs 191 disposed within the valve casing 169. The latching member 159 has an upper bifurcated portion 192, the legs of which 193 straddle the reduced section 162 of the dump-valve stem 163. Also, the bifurcated portion 192 has a pair of integrally formed hook members 194, which engage a cross-pin 195 supported by a pair of bracket members 196 integrally formed with a lower cap 197. The hook members 194 have extending thereacross a pivot pin 199, to which is pivotally connected a spring guide rod 200. A washer 201 encircles the spring guide rod 200 and bears against the upper ends of the hook members 194.

During the opening operation, the latch member 159 is pulled downwardly by the latch pin 158 movable with the conducting bridging member 36 against the opposition afforded by the compression springs 191. This opens the first dump valve 164 away from its seat 177 to permit the region 202, which is initially at high pressure to communicate with the region 203, the latter being in free communication with the region 74 within the exhaust chamber 58.

The compression spring 204, encircling the spring guide rod 200, insures that the stop pin 205 disposed transversely between the legs 193 will be maintained against the valve stem 163 insuring that the nose 189 will remain under the latch pin 158 until the hook members 194 strike the cross-pin 195. When this occurs, the latch member 159 will pivot in a clockwise direction about the cross-pin 195 releasing the pin 158. The compression springs 191 will, at this time, attempt to immediately return the first dump-valve 164 to the closed position against the valve seat 177, but this upward motion will be retarded because of high pressure gas which has entered through an opening 206 in the valve casing 169 and into a region 207 (Fig. 17) above a piston ring 209. The high pressure gas, which is entrapped within the region 207 during the opening movement of the first dump-valve 164, will retard the return closing movement of the first dump-valve 164, and this action is desirable to insure that the blast adjacent the movable contact structures will be continued long enough to insure arc interruption and to prevent subsequent arc reignition until the bridging member 36 has separated an adequate isolating distance away from the disconnecting fingers 56 to insure that the circuit will be open.

In general, it will be noted that there is provided an actuating means, generally designated by the reference numeral 210 associated with each interrupting assembly 34. The cross-arm or bridging member 36 constitutes an actuating member, which initiates the opening operation by opening the first dump-valve member 164. In addition, the actuating means 210 for each interrupting assembly 34 comprises a first operating means 211 for opening the movable main contact 95 of the main interrupting unit 44 and a second operating means 212 for causing the opening of the movable impedance contact 126 associated with the impedance interrupting unit 45. The first operating means 211 includes a first piston 82 and a first dump-valve means 213, the latter including the first dump-valve 164. The second operating means 212 includes a second piston member 125 and a second dump-valve means 214, which includes a second dump-valve 115.

From the foregoing description, it will be apparent that in the closed-circuit position, illustrated in Fig. 2, the electrical circuit through the pole unit 33 includes the hollow terminal stud 32 of one terminal bushing 27, conducting contact foot 43, exhaust chamber 58, orifice plate 60, conducting surface 91, annular main contact 90, vertical side wall portion 89 of first piston member 82, and through the fingers 88 (Fig. 15) to the dump-valve casting 87. The circuit then extends through a plurality of support feet 215, which secure the casting 87 to the bottom casting 139. The circuit then extends through the disconnecting fingers 56 to the conducting bridging member 36. Because of the resistance 54 practically no current flows through the parallel impedance interrupting unit 45.

The circuit extends through the other interrupting assembly 34 of the pole unit 33 in a similar manner and through the other hollow terminal bushing 27 to the upper end thereof, to which a line connection is made.

When it is desired to open the electrical circuit passing through the interrupter, suitable means, not shown, are provided to actuate the pneumatic mechanism 11. This will release or unlatch the mechanism 11 to permit accelerating springs 216 (Fig. 4) associated with each interrupting assembly 34, together with an additional accelerating spring disposed within a housing 217 (Fig. 1) at the outer end of the operating rod 18, to force the several conducting bridging members 36 downwardly. This initial downward motion is quite rapid, but the design of the several shock absorbers 23 is such that the initial downward opening motion is quickly slowed down. During this initial rapid downward opening motion of the several cross-bars 36, the latch pins 158 engaging the noses 189 of the several latch members 159 effect opening of the several first dump-valve means 213. In other words, the downward movement of the latch members 159 effects opening of the first dump-valves 164 to open the connection between the region 203 (Fig. 17) and the region 202, which communicates directly with the region 122, on the lower side of the first piston 82. Because high pressure exists within the region 77 within the tank structure 2, and because there is now a low pressure within the region 122, the first piston member 82 will be forced downwardly to open the movable blast-valve 81 away from its cooperating blast-valve seat 78. This will provide a radially inward blast of gas through the orifice contact 59 the moment the annular segmental main contact 90 separates away from the vertical main contacting surface 91 of the relatively stationary orifice contact 59. The radially inward blast of gas will then carry the arc, which is initially established between the annular main contact 90 and the lower edge of the vertical surface 91, inwardly through the orifice contact 59, so that the upper end of the arc terminates at the arcing terminal 64, whereas the lower end of the arc is blown onto the arc-resisting tip portion 93 of the main movable contact 95. The region 74, which is at a much lower pressure than the tank pressure, will receive the exhaust gases and will permit them to exhaust upwardly through the hollow terminal bushing 27.

When the main current arc has been extinguished in the main current interrupting unit 44, the current through the interrupter is forced to take the parallel path through the impedance interrupting unit 45, which path includes the relatively stationary orifice contact 67 and the movable impedance contact 126. The circuit through the impedance interrupting unit then includes the flexible connector 150, terminal 149 of resistor assembly 54 and, by way of the compression springs 144, through the base casting 147 to the lower casting 139, and hence to the disconnecting fingers 56 to the cross-bar 36.

However, this parallel electrical path including the impedance 54 is soon interrupted, since, near the end of the opening stroke of the movable main contact 95, the valve stem 113 of the second dump-valve 115 is struck by the lower extension 107, and this opens the second dump-valve 115 away from its seat 116 thereby permitting communication between the region 122 and the region 123 by way of the conduit pipe 129 and the vertical conduit 127. Thus, the region 123 below the second piston member 125, associated with the movable impedance contact 126, is exhausted, thereby permitting the high-pressure gas within the tank 2 to force the second piston member 125 downwardly against the upper biasing action exerted by the compression spring 133. This action first breaks the seal between the movable blast valve 131 and its seat 132, thereby permitting a radially inward blast of gas to take place through the orifice contact 67 and causing the extinction of the arc drawn thereat. This residual current arc has its lower end terminating at the tip portion 154 of the movable impedance contact 126, whereas the upper end of the residual current arc is blown into the hollow exhaust chamber 58 to be extinguished.

When the residual current arc, not shown, is extinguished, the circuit through the entire pole unit 33 is interrupted, and continued downward opening travel of the conducting actuating member 36 will bring about the interposition of two isolating gaps between the disconnecting fingers 56 (Fig. 4) and the upper side of the conducting bridging member 36.

In the meantime, of course, the latch 159 associated with the first dump-valve means 213 has been rotated by the hook portions 194 engaging the stop pin 195, thereby releasing the latch pin 158. However, rapid return movement of the first dump valve 164 is not achieved because of the previous entrapment of compressed gas through the opening 206 and into the region 207 (Fig. 17) above the piston ring 209. When this entrapped gas has leaked out sufficiently, the first dump-valve 164 will reclose over its seat 177, thereby sealing off the regions 202 and 203. This will permit high-pressure gas to leak from the region 4 below the valve body 168 to pass by means of the opening 5 (Fig. 17) into the region 202. This will raise the pressure within the region 122 and permit the compression springs 96 to effect reclosure of the movable main contact 95. The increase of pressure within the region 122 will act through the second dump-valve 115 and through the exhaust tube 127 to raise the pressure within the region 123, thereby permitting the spring 133 to effect reclosure of the removable impedance contact 126.

Thus, in the fully open-circuit position of the interrupter, both movable contact structures 49, 50 have reclosed, and the isolating gaps between the disconnecting fingers 56 and the conducting cross-bar 36 are sufficient to hold the voltage and thereby maintain the circuit open through the interrupter.

From the foregoing description, it will be apparent that the external dimensions and general outline of the compressed-gas circuit interrupter of my invention are similar in size and shape relative to that of a comparable oil breaker. The interrupter of my invention includes steel tanks 2, normally inflated to approximately 250 pounds per square inch, pairs of condenser bushings 27 associated with the tanks 2, together with their associated current transformers 28 and potential devices 39. The interrupting assemblies 34 are carried at the lower ends of the bushings 27, and the cross-arm 36 not only operates the interrupting assemblies 34, but also carries the current from one assembly 34 to the other. In addition, the conducting cross-bar 36 serves to establish two isolating gaps in the fully open-circuit position of the interrupter.

All three poles of a three-phase breaker are tied together in a manner similar to that of a conventional oil breaker and are operated by a common pneumatic mechanism 11, shown in Fig. 1. The terminal bushings 27 are not quite standard in that they are constructed for 2,000 amperes continuous current, and have a larger diameter conducting tube 32 through the center thereof, through which the arced gases are exhausted. In addition, they are equipped with exhaust mufflers 218, more fully described hereinafter.

The operating mechanism 11 may be of somewhat conventional style, utilizing compressed air, but will not require the usual compressor and air reservoir since the high-pressure gas may be obtained from a high pressure tank 2 through conduits 22, 24, as indicated in Fig. 1.

Each of the two interrupter assemblies 34 consist of a heavy-duty power interrupter 44, capable of interrupting 50,000 amperes, a low ohmic resistor 54, and an auxiliary impendance interrupter 45, which interrupts the residual current through the resistor 54. The schematic diagrams set out in Figs. 7–11 show the electrical arrangements of the elements just referred to.

The gas conservator, or exhaust chamber 58, is more clearly shown in Figs. 3 and 4. It consists of a closed chamber having a volume of approximately 1½ cubic feet with provision for attachment to the condenser bushing 27 and communicating with the hollow tube 32 forming the center conductor of the bushing 27. To its lower surface is attached the orifice plate 60 for the main interrupter 44 and the orifice plate 69 for the resistor current interrupter 45. Orifice plate 60 includes not only the orifice 59, but the resilient blast valve seat 78 and the main current-carrying contact 91. Orifice plate 69 includes not only the orifice 67, which is an arcing contact, but also the resilient blast-valve seat 132.

The moving parts of the main interrupter 44 consist of the blast-valve 81, the finger contacts 94 and the centrally disposed arcing contact 92, all rigidly attached together and biased towards the closed position by compression springs 96.

The moving parts of the resistor current interrupter 45 consists of the blast-valve 131 and the arcing contact 154, both of which are biased toward the closed position by compression spring 133.

The cross-arm 36 forms the isolating switch, as in a conventional oil breaker, and makes electrical engagement with disconnecting fingers 56. In the closed position, it also engages a latch 159, which, in turn, operates first dump-valve 164 through the valve stem 163.

During the opening of the breaker, the cross-arm 36, moving downwardly in a conventional manner, first opens dump-valve 164 by means of the latch 159. This connects the space 122 under the blast valve 81 to atmospheric pressure through the terminal bushing 27, conservator 58 and the connecting tubing 175. As a result of this reduced pressure, a high pressure on the blast valve area at 219 (Fig. 15) forces it open against the compression springs 96. The first motion unseats the valve at 78, then disengages the fingers 94, from which the arc is immediately blown upon the arcing contacts 64, 93, where it is extinguished.

Paralleling this contact is the resistor 54 and its interrupter 45. As the base of the valve 81 approaches the end of its travel, it engages valve stem 113 unseating the dump valve 115 and connecting space 122 with the region 123 through the interconnecting exhaust tubes 127, 129. By thus connecting space 123 to atmospheric pressure, or at least to a relatively low pressure, valve 131 is opened in a manner similar to valve 81. When this valve 131 opens, the resistor current is drawn in an arc between contacts 67 and 154 and is extinguished.

As the conducting cross-bar 36 moves downwardly, the latch 159 releases latch pin 158 thereby allowing first dump-valve member 164 to reseat. The open period of valve 164 is determined by the velocity of the bridging member 36, as well as by the dashpot action exerted by the air or gas entrapped within the region 207 above the piston ring 209, as shown in Fig. 17. Upon the reseating of the first dump-valve 164, the regions 122 and 123 return to high pressure, and the valves 81 and 131 together with their associated contacts move to the closed position after all arcs are interrupted, but before the contacts reclose, cross-arm 36 has previously disengaged disconnecting fingers 56, thus removing voltage from the entire interrupter and resistor assemblies 34.

During the closing operation, the pneumatic mechanism 11 is actuated by the admittance of gas through the closing valve 21 to force the piston 13 downwardly within the operating cylinder 12, moving the link 16 and operating rod 18 in the closing direction charging the accelerating springs. This will effect an upward movement of the several conducting cross-arms 36 within the tank structures 2, bringing the bridging members 36 into engagement with the disconnecting fingers 56. Since this closing occurs in a 250 pounds per square inch atmosphere, disconnecting fingers 56 and conducting cross-arm 36 are very close before an arc is established. Thus, firm metallic engagement is made before the crest fault current is reached.

The conservator 58 serves as a portion of the current path, presents a large radiating surface to dissipate the heat generated in the contacts, and receives the hot gases from the arcs until they are cooled and released more slowly through the hollow center of the bushings 27, without excessive noise of demonstration. They also serve to limit the amount of gas that could escape through the interrupting orifice 59, 67 during the interval between arc extinction and blast-valve reclosure. The size of the conservators 58 and the area of the opening through the bushings 27 are proportioned to permit acoustic velocities through the orifice 59, 67 for at least 1½ cycles, the time required for ample interrupting opportunities.

For the particular rating disclosed, for 138 kv. at 10,000,000 kva. interrupting capacity, there is a clearance of at least 10 inches between all live parts and the grounded tank structure 2. This provides adequate dielectric strength to meet the required voltage tests on a 138 kv. breaker when the tank 2 is inflated to 250 pounds per square inch. It also provides adequate dielectric strength to prevent flashing to ground at line-to-line voltage should the pressure in the tank 2 be reduced to approximately atmospheric pressure. Since the cross-arm 36 is controlled by external means, a loss of pressure will not close the breaker neither will the two 9 inch gaps between interrupting assemblies 34 permit a voltage failure through the breaker.

Some of the advantages of this type of compressed-air circuit breaker construction are:

(1) Porcelains are only used in compression.
(2) Current transformers and potential devices are available at a small extra cost.
(3) Occupies no more space than the corresponding oil breaker.
(4) Rigid, sturdy construction.
(5) All three poles mechanically tied together.
(6) Contact position indicators easily obtained.
(7) Breaker will not close or fail to ground if pressure is lost.
(8) Low-ohmic resistors provided to permit interruption of 50,000 amperes, independent of circuit recovery rate.
(9) Reduced noise and lack of external demonstration.
(10) Free from mechanical shock when interrupting large fault currents or switching large capacitor banks.
(11) Small, light-weight mechanism and moving parts because cross-arm 36 operates only a light pilot valve 164.

The construction of the exhaust mufflers 218 associated with the hollow terminal bushings 27 will now be described. As mentioned, the interrupting assemblies 34 are spaced approximately 10 inches from the walls of the tank 2 and approximately 9 inches from each other. Under these conditions, the interrupter, when inflated to 250 p.s.i. will withstand 310 kv. R.M.S. 60 cycle for one minute and 650 kv. impulse. At approximately atmospheric pressure within the tank 2, the interrupter will withstand something in excess of line-to-ground voltage.

It is assumed that if a slow leak should develop and the pressure in the breaker tank 2 falls below a predetermined level, disconnecting switches in series could be opened before the pressure drops enough to cause an internal flashover. However, on an opening operation, if the blast-valve should fail, and remain open, the pressure would drop to zero before voltage could be removed from the breaker. In this case, if the power system remained together, and no severe voltage surges occurred, no flashover would result; but if either a lightning stroke occurred or the system fell out of synchronism, higher voltages may appear either between the interrupters 34 or between them and ground than could be withstood by the breaker with atmospheric pressure within the tank 2.

It would be prohibitively expensive to make the tank 2 large enough with the internal dimensions sufficiently adequate to meet this condition. Therefore, I propose to prevent the pressure inside of the tank 2 from ever falling below 1 or 2 atmospheres in the event of an open blast-valve. This is accomplished by placing an automatic exhaust pressure control valve 76 on the exhaust vent 32, as shown in Fig. 13.

As pointed out above, the interrupting assemblies 34 discharge their hot ionized gas into conservators 58, which, in turn, communicate to atmosphere through the hollow condenser bushings 27.

As shown in Figs. 12 and 13, the upper end of the hollow terminal stud 32 is threaded, and in accordance with usual terminal-bushing practice, a flange spring seat 220 is threaded thereto. The spring seat 220 has a plurality of apertures 221, through which extend tension bolts 222, the lower ends of which are threaded into threaded openings 223 of a spring ring 224. Compression springs 226 are provided, encircling the several bolts 222, so that the heads 227 of the tension bolts and washers 228 bear downwardly upon a flange ring 229, maintaining the porcelain casing 231 in compression. Oil is provided within the region 232, as is customary with certain types of terminal bushings, and the oil level may be observed by a float 233, which actuates a magnetic oil gauge 234.

However, in accordance with my invention, the upper end of the hollow terminal stud 32 is additionally extended to accommodate a flange clamp 235, more clearly shown in Fig. 13 of the drawings. It will be observed that the flange clamp 235 has bolted thereto a deflecting cover 236, which deflects the exhaust gases downwardly as indicated by the arrows 237. This prevents the possibility of flashover adjacent bus structure, which may be connected to the line terminal 238 of the condenser bushing 27.

Provided interiorly of the line terminal 238 is a guide recess 239, which guides a valve stem 240 associated with the automatic exhaust pressure control valve 76. As observed in Fig. 13, the exhaust pressure control valve 76 includes compression springs 241, the upper end of which seat against the inner surface 242 of the deflecting cover 236. The lower end of the compression springs 241 seat upon a washer 243, held upon a reduced portion 244 of the valve stem 240 by means of a nut 245. The nut 245 also holds a gasket 246 between the washer 243 and a second washer 247. As shown, the gasket 246 rests upon the upper edge of the hollow terminal stud 32.

From the foregoing description, it will be apparent that the atuomatic exhaust pressure control valve 76, together with its operating springs 241, closes the upper opening of the hollow terminal stud 32 against 1 or 2 atmospheres, or any other pressure desired.

This automatic exhaust pressure control valve 76 not only maintains adequate pressure inside of the tank 2 in case of blast-valve failure, but increases the back pressure on the exhaust side of the interrupting orifices 59, 67 during interruption. This is especially desirable when interrupting capacitive currents, because the dielectric strength of the gas in the region of the orifice is proportional to the pressure maintained. Back pressure also increases the interrupting ability of an orifice when interrupting inductive loads, providing it does not exceed one-half of the up-stream pressure, and thus reduce the velocity in the orifice below the acoustic value.

The current is shunted around the control valve 76 through several pedestal supports 248, through which mounting bolts 249 pass. As a result, the current is carried from the hollow terminal stud 32 through the flange clamp 235, through the pedestal supports 248 and through the deflecting cover 236 to the integrally formed line terminal 238.

When the air pressure within the region 75 of the hollow terminal stud 32 exceeds a predetermined value, it will raise the control valve 76, pass between the supports 248 and escape to atmosphere through suitable vents or louvers, if desired.

Referring particularly to Figs. 20 and 21 of the drawings, it will be observed that I have shown a modified type of relatively stationary orifice contact, generally designated by the reference numeral 250, cooperable with a relatively movable contact 251. These contacts may replace the relatively movable contact structure 49, associated with the main current interrupting unit 44 of Fig. 3. The moving member 251 consists of an arc-resisting tip 252 and a piston 253, the latter taking the place of the first piston member 82 of Fig. 3.

The relatively stationary orifice contact 250 includes a resilient annular blast-valve seat 254, seat retainer 255 and in this particular instance, 12 segmental finger contacts 256. The segmental finger contacts 256 are biased downwardly against the relatively movable contact 251 by a plurality of compression springs 257. In the closed-circuit position of the contact structure, the current path is as indicated in Fig. 20 by the arrows 258.

During the opening operation, the initial downward movement of the movable contact 251 causes the contact fingers 256 to follow, being biased by the compression springs 257, until they engage the stop at 259. Slightly before this point is reached, the blast-valve seat 254 disengages the movable contact at 260 (Fig. 21), and the air-blast impinging upon the contact fingers 256 causes them to rotate about their hinge pivots 261 to the stop 262, thus drawing an arc 225 at the point 263. From here this arc is blown into the orifice as shown at 230 in Fig. 21, where it is extinguished in the usual way.

In this particular contact structure, there exists the following features and advantages:

(1) The segmental contact fingers 256 follow the moving contact member 251 until the blast-valve opens, at which time the contact fingers 256 reverse their motion and move in a direction opposite to the motion of the movable contact member 251. Since it is difficult to move a short arc from its point of inception, the reverse motion of the contact fingers 256 shortens the time to obtain an arc long enough to move, and thus minimizes contact burning.

(2) The segmental contact fingers 256, when blown against the stop 262, form the orifice, and therefore the arc is actually drawn on the edge of the orifice, which again is conducive to quick transfer into the orifice.

(3) The orifice opening, or area, is self-adjustable in response to current magnitude. When very large values of current are interrupted, the arc completely fills the orifice, and the pressure generated at 264 exceeds that at 265, the orifice may enlarge to accommodate the current.

(4) As noted by the arrows 258, the current path, as it flows through the segmental contacts 256, is such that the magnetic forces assist the air-blast in moving the arc off of the contacts and into the orifice. This effect was noted when interrupting 43,000 amperes, i.e., the point 265 was burned more than the point 266. It is believed that if the orifice formed by the fingers and the stop 265 were made slightly shorter and both points covered with arc-resisting material, considerable improvement would be obtained over that experimentally observed.

(5) When interrupting large values of current that completely fill the orifice, hot ionized gas will frequently blow back against the air pressure in the direction indicated by the arrows 267. As the current recedes towards its zero value, this gas blows back into the arc path and causes reignition. With the design shown in Figs. 20 and 21, the blow-back gas is carried out of the space 268 through the gaps between the segments 256, as fast as it is formed.

Two semicircular spacers 269 are used adjacent to the hinge points 261 to prevent the air-blast from blowing the segments 256 into the exhaust air passage.

Fig. 22 shows an enlarged, fragmentary, vertical sectional view through a modified type of arc-extinguishing assemblage 270 incorporating a main current interrupting unit 271 and an electrically parallel disposed impedance interrupting unit 272. Only a portion of the impedance interrupting unit 272 is shown, as is only a portion of the contact structure for the main current interrupting unit. It will be obvious, however, that, comparing Fig. 22 with Fig. 3, the compression spring 273 is analogous to the battery of compression spring 96 in Fig. 3. Also, the first piston 82 of Fig. 3 is analogous to the first piston 274 of Fig. 22, and the contact structure generally is the same in Fig. 22 as it was in Fig. 3, heretofore described.

A conduit 275, somewhat diagrammatically illustrated in Fig. 22, is analogous to the conduit 184 in Fig. 3, being connected to the hollow exhaust chamber 58. The conducting bridging member, or cross-bar 276, in Fig. 22 is analogous to the cross-arm 36 of Fig. 3, and generally operates in a similar manner. The only important difference of the structure in Fig. 22 over that of the interrupting assemblage 34 heretofore described is in the latching means 277, which operates the first dump-valve means 278. It will be noted that a latch 279 has its nose 280 engaged by a latching cross-pin 281 secured to and movable with the conducting cross-bar 276.

The latch 279 is pivotally connected at 282 to a valve stem 283 of a first dump valve 284, spring-biased to the closed position against its seat 285 by a compression spring 286.

The latch 279 has a laterally extending portion 287, which is pivotally connected at 288 to a dashpot rod 289, spring-biased in a downward direction by a compression spring 290. The dashpot rod 289 has its upper end connected to a dashpot piston 291 movable in a dashpot chamber 292, which, in this particular instance, constitutes an integral part of the valve casing 293 of the first dump valve 284.

Generally, the operation of the modified type of arc-extinguishing assemblage 270 is the same as that of Fig. 3, heretofore described, namely: Downward opening movement of the cross-arm 276 causes the latching pin 281 to pull the latch 279 downwardly, carrying the valve stem 283 and the first dump valve 284 downwardly against the upward spring pressure exerted by the compression spring 286. This permits communication between the exhaust conduit 275 leading to the hollow exhaust chamber 58 (Fig. 3) with the region 294, which interconnects through a conduit 295 with the region 296 below the first piston 274. This exhausts the high pressure from the region 296 in back of the first piston 274 through the exhaust conduit 275 and through the hollow terminal bushing, not shown, to permit the high-pressure gas within the tank 2 to act downwardly upon the first piston 274, causing downward opening movement of the same.

The latch 279, first dump valve 284 and the dashpot rod 289 all move downwardly with the cross-bar 276 until the dashpot piston 291 strikes the lower end 297 of the dashpot chamber 292. When this occurs, the laterally extending portion 287 will be halted, and further downward continued movement of the cross-bar 276 will effect a clockwise rotation of the latch 279, thereby releasing the nose 280 of the latch 279 from under the latching pin 281. This movement of the latch 279 is additionally guided by a guide link 298, pivotally connected, as at 299, to the lower base casting 300 of the arc-extinguishing assemblage 270.

The foregoing clockwise rotation of the latch 279 will, consequently, effect release from the latching pin 281, thereby permitting the cross-arm 276 to move downwardly, free of the latch 279, but still in sliding contact with disconnecting fingers 301.

The open period of the first dump valve 284 is determined by the downward opening velocity of the conducting cross-bar 276, the distance between the dashpot piston 291 and the lower end 297 of the dashpot chamber 292, as well as the dashpot action of the piston 291. Upon reseating of the first dump valve 284, the region 296 returns to high pressure and the contact structures within both the main current interrupting unit 271 and the impedance interrupting unit 272 reclose.

The operation of the second dump valve 302 and the exhausting of high pressure from beneath the second piston associated with the impedance interrupting unit through the exhaust conduit 303 is the same as that heretofore described in connection with Fig. 3 of the drawings. Fig. 22, therefore, illustrates a further latching arrangement 277 in conjunction with the first dump-valve means 304, which is effective to regulate the length of time that the first dump valve 284 is open.

As mentioned previously, this length of time is important, since it determines the amount of time that the gas blast is effective adjacent the contact structures 49, 50 associated with the main current interrupting unit and the impedance interrupting unit 271, 272. Should this gas blast be ineffective to hold the dielectric at these contact structures for the requisite time, and should, therefore, restriking of the arc occur at these points, the circuit would be opened at the disconnecting fingers 301, which would be undesirable. As a result, the dashpot means 305, associated with the latching means 277 maintains the first dump valve piston 284 open a sufficient length of time to insure continuance of the gas blast adjacent the contact structures 49, 50 of the main current interrupting unit 271 and the impedance interrupting unit 272 until such time as the arcs are out, and the cross-bar 276 has separated downwardly away from the disconnecting fingers 301 a sufficient isolating distance until reclosure of said contact structures 49, 50 may be effected.

Figs. 23 and 24 illustrate a modified type of latching arrangement or means 306, which may be used in place of the latching arrangement illustrated in Figs. 17–19, or the latching arrangement 277 just described in connection with Fig. 22.

It will be observed that the foregoing first dump valve arrangements show operating valves for controlling the blast valves associated with the interrupters. Although these first dump valves have been demonstrated to be operable, they possess a functional weakness, i.e., if the breaker cross-arm does not move to within 3/16 inch of the completely closed position, the latch controlling the operating first dump valves will not engage and a subsequent opening operation may result in drawing an arc external to the interrupter where no interrupting effort will be exerted.

In oil circuit breakers, an opening operation following an incomplete closure, results in arc extinction, except for very heavy faults, and even in this event interruption may be successful. Generally in closing, the circuit will be established through, or inside, of the interrupting arc chamber, and normal interruption will follow. In case of a damaged interrupter, light currents will be interrupted in the oil-filled isolating gap between the interrupter and the cross-arm.

In the compressed-air, or compressed-gas breaker of the present application, the arc, when closing, is established between the cross-arm and the lower end of the already closed interrupter, and any malfunctioning of interrupter, or operating mechanism, will result in drawing the arc below and outside the interrupter in high-pressure air, or gas, which may have a negligible interrupting ability, either for low or for high values of current. In accordance with the first dump valve means 307, illustrated in Figs. 23 and 24, I propose using an operating valve which will overcome the foregoing disadvantages. Referring to these figures, it will be noted that two latch members 308 are attached to the valve stem 309 at the pivotal connection 311, and are pivoted at the stationary pivots 312 supported by brackets 313 integrally formed with a portion of the lower base casting 314.

Rollers 315, shown in Fig. 23 in the breaker-closed position, are carried by the conducting cross-arm 316, shown in end section. The cross arm 316 moves in a vertical direction, and when the rollers 315 are in a position indicated at 310, the cross-arm 316 makes electrical engagement with a set of disconnecting contact fingers, not shown, which are analogous to the disconnecting fingers 56 of Fig. 4 or 301 of Fig. 22, attached to the lower end of the interrupter. During both the closing and the opening operations of the interrupter, the rollers 315 force the latch members 308 apart, which unseats the first dump valve 318 away from its seat at 320. During the closing operation, the rollers 315 are moving at high velocity, and the time that the dump valve 318 is unseated is too short to cause the blast valve and the interrupting contacts, not shown, to be opened.

During the opening stroke, the cross-arm 316 and rollers 315 move rapidly for about the first inch of travel, and then slow down by the chraacteristics of the shock absorbers 23, shown in Fig. 1 of the drawings. This hesitation, or slowing down, prevents the cross-arm 316 from disengaging from the disconnecting contacts before the interrupters have had time to function.

In opening, it is also necessary to have the blast valves and the interrupter remain open until after the cross-arm 316 has disengaged the disconnecting contact fingers and has inserted sufficient insulating gap to hold the voltage. This requires the dump valve at 318 to remain open a predetermined time after the rollers 315 have disengaged the latches 308. This is accomplished by providing a differential piston 321 and controlled volume at 322. During the downward or opening movement of the differential valve piston 321, 250 pounds per square inch air pressure is allowed to enter the space 322 through the check valve at 323. When the differential valve piston 321 is released by the rollers 315, it is forced upward and closed by springs 324 and the 250 pounds per square inch air pressure against the lower side of the piston surface at 325 and also at 326. This closing action is retarded by the trapped air within the region 322, which is compressed and allowed to escape through extraneous leaks and throttling orifices at 327.

In closing, first dump valve 318 is unseated, and the dashpot at 322 tries to delay its reclosing, but in this case the cross-arm 316 has engaged the lever 328 by a suitable projection, not shown, attached thereto, and has opened the check valve 323 by raising the rod 328. Also, the first dump valve 318 is rapidly forced closed by the cross-arm 316, which engages the dump valve piston 309 at 326.

In the event that the breaker comes to within two inches of the fully closed position, and reverses its motion, the interrupting function will be completed. Also, if it reaches this position and stalls, the interrupter will open and remain open until the air pressure drops sufficiently to operate the trip-free latch on low pressure. In this case, the cross-arm will either open and insert the normal isolating gap and allow the interrupter to reclose, or the cross arm will remain struck and the interrupters remain open until all the air is lost and then reclose without going to ground, thus requiring some other breaker in the system to open the circuit.

It will be observed, in this connection, that this additional length of two inches is brought about by the vertical height H along the inner surfaces of the pivotally mounted latches 308. In other words, the rollers 315, contacting the latches 308, anywhere along the vertical height H will effect their opening.

With the valve described, I have increased the critical distance for an incomplete closing operation from 3/16 inch to approximately 2 inches.

From the foregoing, it will be apparent that with the interrupter of Fig. 3, the inertia of the moving parts during the closing operation was assumed to be sufficient to insure that the breaker would be closed to its practically fully closed position, before a reversal of the operating mechanism would cause it to open. This, of course, is concerned with the situation of closing the interrupter when fault current conditions exist on the transmission line controlled by said interrupter. Thus, the inertia of the mechanism of Fig. 1 was assumed to insure practically complete closure before the cross arm would reverse its motion.

However, with the first dump valve means 307 of Figs. 23 and 24, the operating mechanism may be designed to permit reversal of the cross arm 316 when it is even two inches from the fully closed position. This is insured by the vertical height H along the latches 308, so that when the rollers 315 strike anywhere along these vertical surfaces 329, the latches 308 will be spread apart and the first dump valve means 318 will be opened, as during a normal opening operation.

During a normal closing, a projection on the cross-arm 316, not shown, strikes the lever 328, opening the check valve 323 and releasing the pressure from within the region 322, thereby insuring rapid closure of the first dump valve 318, even though the rollers 315 spread the latches 308 during such a closing operation. Also, quick reclosure of the first dump valve 318 during such a closing operation is insured by the cross-bar 316 itself striking the lower end 326 of the differential piston 309.

During a normal opening operation, however, the check valve 323 is opened by cavitation existing within the region 322, or by suction occurring therein, during the time that the differential piston 321 is moving downwardly and before it engages its stop 330. Release of the latches 308, by the rollers 315, during such a normal opening operation, insures the dashpot action occurring within the region 322, since during this time the check valve 323 is closed and reliance must be had upon extraneous leakage to insure a drop of pressure within the region 322 and a consequent reclosure of the first dump valve 318 by the compression springs 324.

From the foregoing description, it will be apparent that I have provided an improved compressed gas circuit interrupter particularly designed for high power interruption, although certain features may have suitability for lower power application. The entire structure is rigid, with the tanks at ground potential, thereby insuring safety to station attendants. The compressed gas for operating the pneumatic mechanism may be taken from one of the storage tanks 2 itself, and because of the high pressure existing within the tanks 2, the isolating gaps provided by the conducting bridging members may be relatively small. Since the interrupters reclose in the fully open-circuit position, the circuit is made during the closing stroke between the conducting cross-bar and the disconnecting fingers.

In addition, I have shown a number of latching arrangements for effecting the operation of the first dump valve means associated with the main current interrupting unit. The first dump valve means illustrated relied upon the presence of considerable inertia in the operating mechanism to insure a relatching of the first dump valve means. The same thing is true with the first dump valve means illustrated in Fig. 22 of the drawings. However, in Figs. 23 and 24, I have illustrated the latching arrangement for a first dump valve means which is effective, even though the breaker may reverse at a point where it is two inches or more from its fully closed-circuit position.

Further, I have described novel compressed gas contact structures suitable for providing a variable orifice opening during the interruption of low and high values of current. Many of these features may have applicability apart from the structures in which they are shown, that is, utilized by themselves apart from other features which have been illustrated and described herein.

The addition of control valves to control the exhaust of pressure through the hollow terminal bushings insures two or three atmospheres pressure within the tanks 2, even though the gas pressure may be exhausted by a non-replenishment from a suitable compressor source, and this will maintain the dielectric strength of the gas within the tanks 2 to a sufficient level to prevent flashover interiorly of the tanks.

It may be desirable, in the construction of gas-blast circuit interrupters for lower kva. interrupting capacity than that heretofore-mentioned, to omit entirely the impedance interrupting unit 45 and to rely solely upon the main current interrupting unit 44. Such a modified arrangement would, of course, dispense with the second operating means 212 including the second dump-valve means 214. Thus the impedance interrupting unit may be used in interrupters only for the higher kva. interrupting capacities associated with the interruption of the higher powers. Certain features of the invention are, obviously, not dependent upon the use of the parallel disposed impedance interrupting unit 45, but may be used with only the main current interrupting unit 44.

Although I have shown and described specific structures, it is to be clearly understood that the same were merely for the purpose of illustration, and that changes and modifications therein may be readily made by those skilled in the art without departing from the spirit and scope of the invention.

I claim as my invention:

1. A compressed gas circuit interrupter including means defining a grounded enclosure the entire volume of which constantly contains a gas under pressure, an interrupting assembly disposed interiorly within said enclosure and including a main current interrupting unit and an impedance interrupting unit, means connecting said main current interrupting unit and said impedance interrupting unit in electrical parallel with each other, said impedance interrupting unit having a pair of separable impedance contacts which are closed in the closed-circuit position of the circuit interrupter, said main current current interrupting unit having a movable main contact associated therewith, first operating means for initially causing the opening movement of said movable main contact to force the current to flow through the parallel path afforded by the closed impedance contacts in said impedance interrupting unit, and second operating means for subsequently causing an opening movement of one of said impedance contacts subsequent to the opening of said movable main contact to interrupt the flow of residual current thruogh the impedance interrupting unit.

2. A compressed gas circuit interrupter including means defining a grounded enclosure all parts of which constantly contain a gas under pressure, an interrupting assembly disposed interiorly within said enclosure and including a main current interrupting unit and an impedance interrupting unit, means connecting said main current interrupting unit and said impedance interrupting unit in electrical parallel with each other, said impedance interrupting unit having a pair of separable impedance contacts which are closed in the closed-circuit position of the circuit interrupter, said main current interrupting unit having a movable main contact associated therewith, first operating means including a piston movable with said movable main contact and also including first dumping means for exhausting gas from the back side of said piston to effect opening movement of said movable main contact, the opening movement of said movable main contact forcing the current to flow through the closed impedance contacts in the parallel disposed impedance interrupting unit, one of said separable impedance contacts being movable, second operating means including a piston movable with said movable impedance contact and also including second dumping means for exhausting the gas from in back of said last-mentioned piston to effect opening movement of said one movable impedance contact, means causing actuation of said second operating means subsequent to the actuation of said first operating means so that the movable impedance contact will open only after the opening movement of said movable main contact, and the opening movement of said movable impedance contact effecting interruption of the residual current passing through said impedance interrupting unit.

3. The combination in a compressed-gas circuit interrupter of a grounded tank entirely filled at all times with gas under pressure, a pair of terminal bushings extending through the top of said tank, an interrupting assembly depending from the interior end of each terminal bushing, each interrupting assembly including a main current interrupting unit and an impedance interrupting unit, means associated with each interrupting assembly for electrically connecting the main current and impedance interrupting units of that assembly in electrical parallel, each main current interrupting unit having a movable main contact associated therewith, each impedance interrupting unit having a movable impedance contact associated therewith, the movable impedance contact being in its closed position in the closed circuit position of the circuit interrupter, actuating means associated with each interrupting assembly for causing first opening movement of the main movable contact prior to opening movement of the movable impedance contact, and a conducting cross-arm electrically interconnecting the two interrupting assemblies for initiating said actuating means during the opening operation.

4. The combination in a compressed-gas circuit interrupter of a grounded tank the whole interior volume of which is constantly filled with gas under pressure, a pair of hollow terminal bushings extending through the top of said tank, an interrupting assembly depending from the interior end of each terminal bushing, each interrupting assembly including a main current interrupting unit and an impedance interrupting unit, means associated with each interrupting assembly for electrically connecting the main current and impedance interrupting units of that assembly in electrical parallel, each main current interrupting unit having a movable main contact associated therewith, each impedance interrupting unit having a movable impedance contact associated therewith, the movable impedance contact being in its closed position in the closed-circuit position of the circuit interrupter, actuating means associated with each interrupting assembly for first causing opening movement of the main movable contact prior to opening movement of the movable impedance contact, a conducting cross-arm electrically interconnecting the two interrupting assemblies for initiating said actuating means during the opening operation, and means causing an arc-extinguishing blast of gas adjacent each movable main contact during its opening movement and out through the hollow terminal bushing which supports it.

5. A compressed-gas circuit interrupter including a grounded tank wholly constantly filled with gas under pressure, a pair of terminal bushings extending into said tank, an interrupting assembly associated with each terminal bushing, a conducting bridging member for electrically bridging the two interrupting assemblies in the closed circuit position of the interrupter, each interrupting assembly including a main current interrupting unit and an impedance interrupting unit, means connecting said main current interrupting unit and said impedance interrupting unit in electrical parallel with each other, the impedance interrupting unit including a separable pair of impedance contacts which are closed in the closed circuit position of the circuit interrupter, said main current interrupting unit having a movable main contact associated therewith, a piston for actuating the movable main contact of each main current interrupting unit, dump valve means associated with each interrupting assembly for exhausting gas from in back of the respective piston for causing opening movement of the respective main movable contact, and the initial opening movement of said conducting bridging member effecting actuation of the two dump valve means for bringing about opening movement of the two movable main contacts associated with the two interrupting assemblies.

6. A compressed-gas circuit interrupter including a grounded tank wholly constantly filled with gas under pressure, a pair of terminal bushings extending into said tank, an interrupting assembly associated with each terminal bushing, a conducting bridging member for electrically bridging the two interrupting assemblies in the closed circuit position of the interrupter, each interrupting assembly including a main current interrupting unit and an impedance interrupting unit, means connecting said main current interrupting unit and said impedance interrupting unit in electrical parallel with each other, said main current interrupting unit having a movable main contact associated therewith, said impedance interrupting unit having a movable impedance contact associated therewith, the movable impedance contact being in its closed position in the closed circuit position of the circuit interrupter, a first piston for actuating the movable main contact of each main current interrupting unit, a second piston for actuating the movable impedance contact of each impedance interrupting unit, first dump valve means associated with each interrupting assembly for exhousing gas from in back of the respective first piston for causing opening movement of the respective main movable contact, second dump valve means associated with each interrupting assembly for exhausting gas from in back of the respective second piston for causing opening movement of the respective movable impedance contact, means rendering the second dump valve means responsive to the functioning of the first dump valve means so as to be subsequent in operation thereto, and the initial opening movement of said conducting bridging member effecting actuation of the two first dump valve means for bringing about opening movement of the two movable main contacts associated with the two interrupting assemblies.

7. The combination in a compressed-gas circuit interrupter of a pressurized grounded tank completely constantly filled with gas under pressure, a hollow terminal bushing extending into said pressurized tank, an interrupting assembly including a hollow exhaust chamber disposed adjacent the interior end of said hollow terminal bushing and communicating with the interior of said hollow terminal bushing, said interrupting assembly also including a main current interrupting unit and an impedance interrupting unit disposed in electrical parallel relationship thereto, the main current interrupting unit including a relatively stationary main contact, the impedance interrupting unit including a relatively stationary impedance contact, both the relatively stationary main contact and the relatively stationary impedance contact being supported by said hollow exhaust chamber, said main current interrupting unit also having a movable main contact cooperable with said relatively stationary main contact, said impedance interrupting unit also having a movable impedance contact cooperable with said relatively stationary impedance contact, the relatively stationary impedance contact making contacting engagement with the movable impedance contact in the closed circuit position of the circuit interrupter, means causing a blast of arc-extinguishing gas from the region within said tank to flow adjacent the relatively stationary and movable main contacts to exhaust into said hollow exhaust chamber, and means causing a subsequent blast of arc-extinguishing gas from the region within said tank to flow adjacent the relatively stationary and movable impedance contacts to exhaust into said hollow exhaust chamber.

8. The combination in a compressed-gas circuit interrupter of a grounded pressurized tank completely constantly filled with gas under pressure, a hollow terminal bushing extending into said pressurized tank, an interrupting assembly including a hollow exhaust chamber disposed adjacent the interior end of said hollow terminal bushing and communicating with the interior of said hollow terminal bushing, said interrupting assembly also including a main current interrupting unit and an impedance interrupting unit disposed in electrical parallel relationship thereto, the main current interrupting unit including a relatively stationary main contact, the impedance interrupting unit including a relatively stationary impedance contact, both the relatively stationary main contact and the relatively stationary impedance contact being supported by said hollow exhaust chamber, said main current interrupting unit also having a movable main contact cooperable with said relatively stationary main contact, a first piston to effect movement of said movable main contact, a first dump valve means for dumping gas from in back of said first piston to effect opening movement of said movable main contact, said impedance interrupting unit also having a movable impedance contact cooperable with said relatively stationary impedance contact, the relatively stationary impedance contact making contacting engagement with the movable impedance contact in the closed circuit position of the circuit interrupter, a second piston to effect movement of said movable impedance contact, a second dump valve means for dumping gas from in back of said second piston to effect opening movement of said movable impedance contact, means effective to actuate said first dump valve means to cause a blast of arc-extinguishing gas from the region within said tank to flow adjacent the relatively stationary and movable main contacts to exhaust into said hollow exhaust chamber, and means responsive to an actuation of said first dump valve means for initiating subsequent operation of said second dump valve means to cause a subsequent blast of arc-extinguishing gas from the region within said tank to flow adjacent the relatively stationary and movable impedance contacts to exhaust into said hollow exhaust chamber.

9. The combination in a compressed-gas circuit interrupter of a grounded tank wholly constantly filled with gas under pressure, a pair of hollow terminal bushings extending into said grounded tank, an interrupting assembly associated with the interior end of each hollow terminal bushing including a hollow exhaust chamber, each hollow exhaust chamber being in communication with the interior of its respective hollow terminal bushing, each interrupting assembly also including a main current interrupting unit and an impedance interrupting unit, both said units being in electrical parallel relationship, both the main current interrupting unit and the impedance interrupting unit each having a relatively stationary contact supported by the respective hollow exhaust chamber, both the main current interrupting unit and the impedance interrupting unit each having a movable contact, the relatively stationary and movable impedance contacts making contacting engagement in the closed circuit position of the circuit interrupter, and means including a conducting bridging member for opening the movable contact of each main current interrupting unit prior to the opening of the movable contacts associated with the impedance interrupting units.

10. The combination in a compressed-gas circuit interrupter of a grounded tank completely constantly filled with gas under pressure, a pair of hollow terminal bushings extending into said grounded tank, an interrupting assembly associated with the interior end of each hollow terminal bushing including a hollow exhaust chamber, each hollow exhaust chamber being in communication with the interior of its respective hollow terminal bushing, each interrupting assembly also including a main current interrupting unit and an impedance interrupting unit, both said units being in electrical parallel relationship, both the main current interrupting unit and the impedance interrupting unit each having a relatively stationary contact supported by the respective hollow exhaust chamber, both the main current interrupting unit and the impedance interrupting unit each having a movable contact, the relatively stationary and movable impedance contacts making contacting engagement in the closed circuit position of the circuit interrupter, first and second dump valve means associated with each interrupting assembly for respectively opening the movable contact of the main current interrupting unit and the movable contact of the impedance interrupting unit, and means for sequentially actuating the first and second dump valve means of each interrupting assembly.

11. The combination in a compressed-gas circuit interrupter of a grounded tank completely constantly filled with gas under pressure, a pair of hollow terminal bushings extending into said grounded tank, an interrupting assembly associated with the interior end of each hollow terminal bushing including a hollow exhaust chamber, each hollow exhaust chamber being in communication with the interior of its respective hollow terminal bushing, each interrupting assembly also including a main current interrupting unit and an impedance interrupting unit, both said units being in electrical parallel relationship, both the main current interrupting unit and the impedance interrupting unit each having a relatively stationary contact supported by the respective hollow exhaust chamber, both the main current interrupting unit and the impedance interrupting unit each having a movable contact, the relatively stationary and movable impedance contacts making contacting engagement in the closed circuit position of the circuit interrupter, first and second dump valve means associated with each interrupting assembly for respectively opening the movable contact of the main current interrupting unit and the movable contact of the impedance interrupting unit, and means including a conducting cross-bar electrically interconnecting the two interrupting assemblies for sequentially actuating the first and second dump valve means of each interrupting assembly.

12. A compressed-gas circuit interrupter including a pressurized tank at ground potential and filled with gas under pressure, a hollow terminal bushing extending into said pressurized tank and supporting an interrupting assembly at its interior end, said interrupting assembly including a hollow-exhaust chamber communicating with the space interiorly of the hollow terminal bushing together with main current and impedance interrupting units, a conduit communicating at one end with the space interiorly of said hollow exhaust chamber, first dump valve means disposed adjacent the other end of said conduit, latching means for initiating operation of said first dump valve means, an actuating member for momentarily latching to said latching means during the initial portion of the opening operation, first contact means including a piston for drawing an arc at the main current interrupting unit to thereby force the current to flow through the parallel path afforded by said impedance interrupting unit, said first dump valve means exhausting the gas from in back of said piston to effect opening of said first contact means, second contact means associated with said impedance interrupting unit, and means responsive to the opening of said first contact means to effect a subsequent opening of said second contact means to break the flow of residual current.

13. A compressed-gas circuit interrupter including a pressurized tank at ground potential and filled with gas under pressure, a hollow terminal bushing extending into said pressurized tank and supporting an interrupting assembly at its interior end, said interrupting assembly including a hollow-exhaust chamber communicating with the space interiorly of the hollow terminal bushing together with main current and impedance interrupting units, a conduit communicating at one end with the space interiorly of said hollow exhaust chamber, first dump valve means disposed adjacent the other end of said conduit, latching means for initiating operation of said first dump valve means, an actuating member for momentarily latching to said latching means during the initial portion of the opening operation, first contact means including a first piston for drawing an arc at the main current interrupting unit to thereby force the current to flow through the parallel path afforded by said impedance interrupting unit, said first dump valve means exhausting the gas from in back of said first piston to effect opening of said first contact means, second contact means associated with said impedance interrupting unit, a second piston for effecting opening of said second contact means, second dump valve means for effecting opening of said second contact means by dumping gas from in back of said second piston, and means responsive to opening movement of said first contact means to effect operation of said second dump valve means to open said second contact means to break the flow of residual current.

14. The combination in a compressed-gas circuit interrupter of a pressurized enclosure filled with gas under pressure, an exhaust conduit leading into said pressurized enclosure, an interrupting assembly associated with the interior end of said exhaust conduit including a main current interrupting unit and an impedance interrupting unit, means including a hollow conducting exhaust chamber for electrically connecting said main current interrupting unit and said impedance interrupting unit in electrical parallel relationship, said hollow conducting exhaust chamber communicating with the interior of said exhaust conduit, each of said interrupting units having an orifice-shaped relatively stationary contact in a wall of said exhaust chamber so that a blast of gas may pass through the orifices provided by said orifice-shaped relatively stationary contacts and exhaust into said hollow exhaust chamber, each of said interrupting units having a cooperable movable contact which makes contacting engagement with the respective orifice-shaped relatively stationary contacts in the closed circuit position of the circuit interrupter, means for first establishing an arc between the movable contact and the orifice-shaped contact of the main current interrupting unit while the separable impedance contacts remain closed, said arc being blasted by gas out through the orifice-shaped relatively stationary contact into the exhaust chamber, and means for subsequently establishing a residual current arc between the movable contact and the relatively stationary orifice-shaped contact of said impedance interrupting unit, and the residual current arc being blasted by a blast of gas out through the orifice-shaped relatively stationary contact associated with the impedance interrupting unit to exhaust into said hollow exhaust chamber.

15. The combination in a compressed-gas circuit interrupter of a pressurized enclosure filled with gas under pressure, an exhaust conduit leading into said pressurized enclosure, an interrupting assembly associated with the interior end of said exhaust conduit including a main current interrupting unit and an impedance interrupting unit, means including a hollow conducting exhaust chamber for electrically connecting said main current interrupting unit and said impedance interrupting unit in electrical parallel relationship, said hollow conducting exhaust chamber communicating with the interior of said exhaust conduit, each of said interrupting units having an orifice-shaped relatively stationary contact in a wall of said exhaust chamber so that a blast of gas may pass through the orifices provided by said orifice-shaped relatively stationary contacts and exhaust into said hollow exhaust chamber, said main current interrupting unit having a movable main contact cooperable with one of said orifice-shaped contacts, a piston for moving said movable main contact, dump valve means for exhausting gas from in back of said piston to effect opening of said movable main contact to establish a main current arc, a blast of gas passing adjacent said main current arc and exhausting out into said hollow exhaust chamber, said impedance interrupting unit having a movable impedance contact making contacting engagement with the other orifice-shaped relatively stationary contact in the closed circuit position of the circuit interrupter, and means for opening said movable impedance contact subsequent to opening said movable main contact to interrupt the residual current arc by a blast of gas out through said other orifice-shaped relatively stationary contact.

16. A compressed-gas circuit interrupter including an enclosure filled with gas under pressure, a pair of exhaust conduits extending into said enclosure, an interrupting assembly associated with the interior end of each of said exhaust conduits including a main current interrupting unit and an impedance interrupting unit, means including a hollow conducting exhaust chamber associated with the interior end of each exhaust conduit for electrically connecting the main current interrupting unit and the impedance interrupting unit of each interrupting assembly in electrical parallel, the interior of each exhaust conduit communicating with the interior of its respective conducting exhaust chamber, contact structure for each main current interrupting unit and each impedance interrupting unit, the contact structure of the impedance interrupting unit being closed in the closed circuit position of the circuit interrupter, and means including a conducting bridging member for opening the contact structure of each main current interrupting unit prior to the opening of the contact structure of its associated impedance interrupting unit.

17. A compressed-gas circuit interrupter including an interrupting unit having relatively movable contact structure, a piston for effecting the opening of said contact structure, dump-valve means including a releasable latch for dumping the gas from in back of said piston, an actuating member for momentarily latching to said releasable latch during the opening operation to actuate said dump-valve means, and dashpot means for effecting a relatively slow reclosure of said dump-valve means.

18. A compressed-gas circuit interrupter including an interrupting unit having relatively movable contact structure, a piston for effecting the opening of said contact structure, dump-valve means including a releasable latch for dumping the gas from in back of said piston, an actuating member for momentarily latching to said releasable latch during the opening operation to actuate said dump-valve means, means for effecting release of said releasable latch at a predetermined point in the opening operation to free said actuating member therefrom, and dashpot means for effecting a relatively slow reclosure of said dump-valve means.

19. A compressed-gas circuit interrupter including an interrupting unit having relatively movable contact structure, a piston for effecting the opening of said contact structure, dump-valve means including a pair of cooperable rotatable latch hooks for dumping the gas from in back of said piston, an actuating member for momentarily latching to said pair of cooperable rotatable latch hooks during the opening operation to actuate said dump-valve means, and dashpot means for effecting a relatively slow reclosure of said dump-valve means.

20. A compressed-gas circuit interrupter including an interrupting unit having relatively movable contact structure, a first piston for effecting the opening of said contact structure, dump-valve means including a dump-valve having a valve stem constituting a second piston, said dump valve means dumping gas from in back of said first piston to effect opening of said contact structure, means for causing a flow of compressed gas in front of said second piston during the actuation of said dump-valve means, said dump-valve means also including a releasable latch, an actuating member for momentarily latching to said releasable latch during the opening operation to actuate said dump-valve means, and dashpot means including said second piston for effecting a relatively slow reclosure of said dump-valve means.

21. A compressed-gas circuit interrupter including means defining a pressurized enclosure containing an enclosed gas under pressure, a hollow supporting exhausting terminal bushing extending through a wall of said pressurized enclosure and fixedly secured thereto, an interrupting assembly disposed interiorly within said pressurized enclosure supported by the interior end of said hollow exhausting bushing and including a main current interrupting unit and an impedance interrupting unit, means connecting said main current interrupting unit and said impedance interrupting unit in electrical parallel with each other, said main current interrupting unit having a pair of separable main contacts which are in closed engagement in the closed-circuit position of the circuit interrupter, said impedance interrupting unit having a pair of separable impedance contacts which are in closed engagement in the closed-circuit position of the circuit interrupter, first operating means for initially causing the opening movement of one of said pair of separable main contacts of the main current interrupting unit to draw a main current arc therebetween, first blast valve means for causing a gas blast to exhaust externally of said pressurized enclosure through said hollow supporting bushing for extinguishing said main current arc, the current through the circuit interrupter being forced to flow through the parallel path afforded by the closed impedance contacts in said impedance interrupting unit following extinction of said main current arc by said gas blast, second operating means for subsequently causing an opening movement of one of said impedance contacts subsequent to the opening of said movable main contact to draw a residual current arc at the impedance interrupting unit, means responsive to predetermined opening movement of said one movable main contact to initiate operation of said second operating means, and second blast valve means for causing a gas blast to exhaust externally of said pressurized enclosure also through said hollow supporting insulator for extinguishing said residual current arc at the impedance interrupting unit.

References Cited in the file of this patent

UNITED STATES PATENTS

| | | |
|---|---|---|
| 1,226,114 | Randall | May 15, 1917 |
| 2,125,525 | Thommen | Aug. 2, 1938 |
| 2,153,400 | Trencham | Apr. 4, 1939 |
| 2,459,600 | Strom | Jan. 18, 1949 |
| 2,470,628 | Ludwig et al. | May 17, 1949 |
| 2,507,210 | Ludwig et al. | May 9, 1950 |
| 2,561,192 | Forwald | July 17, 1951 |
| 2,574,334 | Latour | Nov. 6, 1951 |
| 2,581,571 | Baker et al. | Jan. 8, 1952 |
| 2,588,933 | Latour | Mar. 11, 1952 |
| 2,616,008 | Baker et al. | Oct. 28, 1952 |
| 2,645,697 | Beatty | July 14, 1953 |
| 2,665,351 | Forwald | Jan. 5, 1954 |
| 2,691,085 | Beatty | Oct. 5, 1954 |
| 2,790,050 | Fawdrey et al. | Apr. 23, 1957 |

FOREIGN PATENTS

| | | |
|---|---|---|
| 575,108 | Great Britain | Feb. 4, 1946 |
| 582,599 | Great Britain | Nov. 21, 1946 |